US011876304B2

(12) United States Patent
Tamrakar et al.

(10) Patent No.: US 11,876,304 B2
(45) Date of Patent: Jan. 16, 2024

(54) MULTIBAND PATCH ANTENNA

(71) Applicant: Intel Corporation, Santa Clara, CA (US)

(72) Inventors: Maruti Tamrakar, Chennai (IN); Jayprakash Thakur, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/448,722

(22) Filed: Sep. 24, 2021

(65) Prior Publication Data

US 2022/0200149 A1 Jun. 23, 2022

(30) Foreign Application Priority Data

Dec. 17, 2020 (EP) .................................... 20214956

(51) Int. Cl.

*H01Q 5/40* (2015.01)
*H01Q 9/04* (2006.01)
*H01Q 5/392* (2015.01)
*H01Q 21/06* (2006.01)
*H01Q 5/378* (2015.01)

(52) U.S. Cl.

CPC ............... *H01Q 5/40* (2015.01); *H01Q 5/378* (2015.01); *H01Q 5/392* (2015.01); *H01Q 9/0414* (2013.01); *H01Q 9/0435* (2013.01); *H01Q 9/0457* (2013.01); *H01Q 21/065* (2013.01)

(58) Field of Classification Search

CPC ...... H01Q 5/40; H01Q 9/0407; H01Q 9/0435; H01Q 9/0464; H01Q 19/005

See application file for complete search history.

(56) References Cited

U.S. PATENT DOCUMENTS 4,821,040 A * 4/1989 Johnson ................. H01Q 13/18 343/789
5,515,057 A * 5/1996 Lennen .................. H01Q 1/243 342/357.29
5,714,961 A * 2/1998 Kot ........................ H01Q 13/18 343/769
5,880,694 A * 3/1999 Wang ................... H01Q 21/065 343/846
6,225,959 B1 * 5/2001 Gordon .................... H01Q 5/40 343/769
6,239,750 B1 * 5/2001 Snygg ...................... H01Q 5/40 343/846
6,597,316 B2 * 7/2003 Rao ...................... H01Q 9/0435 343/846

(Continued)

OTHER PUBLICATIONS

Yusnita Rahayu et al.: "A New 2x4 Array Design of Dual-Band Millimeter-Wave Antenna for 5G Applications," 2018 International Workshop on Antenna Technology (iWAT), Nanjing, 2018, pp. 1-4.

(Continued)

*Primary Examiner* — Ab Salam Alkassim, Jr.
(74) *Attorney, Agent, or Firm* — SPL Patentanwälte PartG mbB; Kieran O'Leary

(57) ABSTRACT

Examples relate to concepts for patch antennas and particular to a method for forming a multiband patch antenna. A multiband patch antenna may comprise a ground layer and an excitation layer, comprising a first excitation patch, a second excitation patch and a feeding patch, wherein the patch is arranged to excite the first excitation patch and the second excitation simultaneously.

15 Claims, 28 Drawing Sheets

(56) References Cited

U.S. PATENT DOCUMENTS

| | | | | |
|---|---|---|---|---|
| 6,876,328 | B2 * | 4/2005 | Adachi | H01Q 9/0428<br>343/846 |
| 7,084,815 | B2 * | 8/2006 | Phillips | H01Q 5/40<br>343/846 |
| 7,253,770 | B2 * | 8/2007 | Yegin | H01Q 9/0407<br>343/700 MS |
| 7,385,555 | B2 * | 6/2008 | Mahmoud | H01Q 5/378<br>343/705 |
| 7,994,999 | B2 * | 8/2011 | Maeda | H01Q 9/0407<br>343/769 |
| 9,590,314 | B2 * | 3/2017 | Celik | H01Q 1/38 |
| 9,673,526 | B1 * | 6/2017 | Jensen | H01Q 13/10 |
| 9,966,669 | B2 * | 5/2018 | Dobric | H01Q 9/0464 |
| 10,141,640 | B2 * | 11/2018 | Howard | H01Q 1/523 |
| 10,181,646 | B2 * | 1/2019 | Celik | H01Q 1/38 |
| 10,290,942 | B1 * | 5/2019 | Catoiu | H01Q 21/22 |
| 10,505,279 | B2 * | 12/2019 | Celik | H01Q 1/48 |
| 10,727,589 | B2 * | 7/2020 | Ikeda | H01Q 5/328 |
| 10,770,794 | B2 * | 9/2020 | Bartone | H01Q 9/045 |
| 10,950,945 | B2 * | 3/2021 | Onaka | H01Q 21/06 |
| 10,950,950 | B2 * | 3/2021 | Fukunaga | H01Q 13/106 |
| 11,271,319 | B2 * | 3/2022 | Celik | H01Q 21/065 |
| 11,522,292 | B1 * | 12/2022 | Cheng | H01Q 5/307 |
| 2002/0047802 | A1 * | 4/2002 | Voipio | H01Q 9/0428<br>343/846 |
| 2005/0179596 | A1 * | 8/2005 | Higasa | H01Q 5/378<br>343/846 |
| 2005/0195110 | A1 * | 9/2005 | Lin | H01Q 9/0414<br>343/846 |
| 2005/0206568 | A1 * | 9/2005 | Phillips | H01Q 5/40<br>343/700 MS |
| 2006/0103576 | A1 * | 5/2006 | Mahmoud | H01Q 1/28<br>343/700 MS |
| 2006/0273961 | A1 * | 12/2006 | Duzdar | H01Q 9/0428<br>343/700 MS |
| 2007/0052587 | A1 * | 3/2007 | Cheng | H01Q 5/378<br>343/700 MS |
| 2008/0042903 | A1 * | 2/2008 | Cheng | H01Q 9/0485<br>343/700 MS |
| 2009/0066601 | A1 * | 3/2009 | Eom | H01Q 1/2291<br>343/798 |
| 2009/0102723 | A1 * | 4/2009 | Mateychuk | H01Q 5/40<br>343/700 MS |
| 2009/0140927 | A1 * | 6/2009 | Maeda | H01Q 9/045<br>343/700 MS |
| 2009/0153404 | A1 * | 6/2009 | Ryou | H01Q 5/378<br>343/848 |
| 2010/0171679 | A1 * | 7/2010 | Ohshima | H01Q 5/364<br>343/893 |
| 2011/0254740 | A1 * | 10/2011 | Maeda | H01Q 5/40<br>343/700 MS |
| 2012/0268347 | A1 * | 10/2012 | Tatarnikov | H01Q 13/106<br>343/893 |
| 2013/0076585 | A1 * | 3/2013 | Kim | H01Q 9/0435<br>343/700 MS |
| 2014/0198014 | A1 * | 7/2014 | Fasenfest | H01Q 9/045<br>343/906 |
| 2014/0266963 | A1 * | 9/2014 | Fasenfest | H01Q 9/045<br>343/857 |
| 2015/0123869 | A1 * | 5/2015 | Bit-Babik | H01Q 21/065<br>29/600 |
| 2015/0207235 | A1 * | 7/2015 | Lee | H01Q 21/24<br>343/767 |
| 2016/0190704 | A1 * | 6/2016 | Celik | H01Q 9/0428<br>343/700 MS |
| 2016/0197404 | A1 * | 7/2016 | Hashimoto | H01Q 1/48<br>343/848 |
| 2018/0191073 | A1 * | 7/2018 | Celik | H01Q 9/0435 |
| 2018/0205151 | A1 * | 7/2018 | Celik | H01Q 15/006 |
| 2019/0229421 | A1 * | 7/2019 | Onaka | H01Q 9/045 |
| 2019/0305430 | A1 * | 10/2019 | Thai | H01Q 9/0414 |
| 2019/0305436 | A1 * | 10/2019 | Legay | H01Q 5/28 |
| 2019/0319367 | A1 * | 10/2019 | Edwards | H01Q 3/2605 |
| 2019/0348749 | A1 * | 11/2019 | Thai | H01L 23/645 |
| 2020/0076087 | A1 * | 3/2020 | Fukunaga | H01Q 9/0464 |
| 2020/0106183 | A1 * | 4/2020 | Fabrega Sanchez | H01Q 1/243 |
| 2020/0212596 | A1 * | 7/2020 | Chen | H01Q 21/065 |
| 2020/0220249 | A1 * | 7/2020 | Asaf | H01Q 1/2283 |
| 2020/0295463 | A1 * | 9/2020 | Yamada | H01Q 21/0025 |
| 2020/0412022 | A1 * | 12/2020 | Yun | H01Q 1/243 |
| 2021/0126372 | A1 * | 4/2021 | Duan | H01Q 5/307 |
| 2021/0151853 | A1 * | 5/2021 | Park | H01Q 1/2283 |
| 2021/0203072 | A1 * | 7/2021 | Wu | H01Q 5/35 |
| 2021/0367358 | A1 * | 11/2021 | He | H01Q 25/00 |
| 2022/0013911 | A1 * | 1/2022 | Lee | H01Q 5/40 |
| 2022/0037787 | A1 * | 2/2022 | Zhong | H01Q 5/50 |
| 2022/0140483 | A1 * | 5/2022 | Hung | H01Q 9/0464<br>343/844 |
| 2022/0247082 | A1 * | 8/2022 | Parsche | H01Q 5/40 |
| 2022/0376399 | A1 * | 11/2022 | Cheng | H01Q 9/0464 |
| 2023/0019425 | A1 * | 1/2023 | Yong | H01Q 23/00 |

OTHER PUBLICATIONS

Osama M. Haraz et al.: "8X8 Patch antenna array with polarization and space diversity for future 5G cellular applications," 2015 International Conference on Information and Communication Technology Research (Ictrc), Abu Dhabi, 2015, pp. 258-261.

Mohsen Khalily et al.: "Broadband mm-Wave Microstrip Array Antenna With Improved Radiation Characteristics for Different 5G Applications," in IEEE Transactions on Antennas and Propagation, vol. 66, No. 9, pp. 4641-4647, Sep. 2018.

Haiyang Xia et al.: "A low-cost dual-polarized 28 GHz phased array antenna for 5G communications," 2018 International Workshop on Antenna Technology (iWAT), Nanjing, 2018, pp. 1-4.

Hanieh Aliakbari et al.: "A single feed dual-band circularly polarized millimeter-wave antenna for 5G communication," 2016 10th European Conference on Antennas and Propagation (EuCAP), Davos, 2016, pp. 1-5.

Mehrdad Nosrati et al.: "A single feed dual-band, linearly/circularly polarized cross-slot millimeter-wave antenna for future 5G networks," 2017 IEEE International Symposium on Antennas and Propagation & USNC/URSI National Radio Science Meeting, San Diego, CA, 2017, pp. 2467-2468.

Jin-Kyoung Du et al.: "Dual-polarized patch array antenna package for 5G communication systems," 2017 11th European Conference on Antennas and Propagation (EUCAP), Paris, 2017, pp. 3493-3496.

Nadeem Ashraf et al.: "28/38-GHz dual-band millimeter wave SIW array antenna with EBG structures for 5G applications," 2015 International Conference on Information and Communication Technology Research (Ictrc), Abu Dhabi, 2015, pp. 5-8.

Junnan Yu et al.: "Stacked-patch Dual-Band & Dual-Polarized Antenna with Broadband Baluns for WiMAX & WLAN Applications"; Progress In Electromagnetics Research M., vol. 68, pp. 41-52, Apr. 27, 2018.

Ya-Qing Wen et al.: "Dual-Polarized and Wide-Angle Scanning Microstrip Phased Array"; IEEE Transactions On Antennas and Propagation, Piscataway, NJ, US, vol. 66, No. 7, Jul. 3, 2018, pp. 3775-3780.

Valentina Palazzi et al.: "Scavenging for Energy: A Rectenna Design for Wireless Energy Harvesting in UHF Mobile Telephony Bands", IEEE Microwave Magazine, IEEE Service Center, Piscataway, NJ, US, vol. 18, No. 1, Dec. 12, 2016, pp. 91-99.

Magid Alzidani et al.: "Ultra-Wideband Differential Fed Hybrid Antenna With High-Cross Polarization Discrimination for Millimeter Wave Applications", IEEE Access, IEEE, USA, published on Apr. 15, 2020, current version of May 13, 2020, pp. 80673-80683.

* cited by examiner

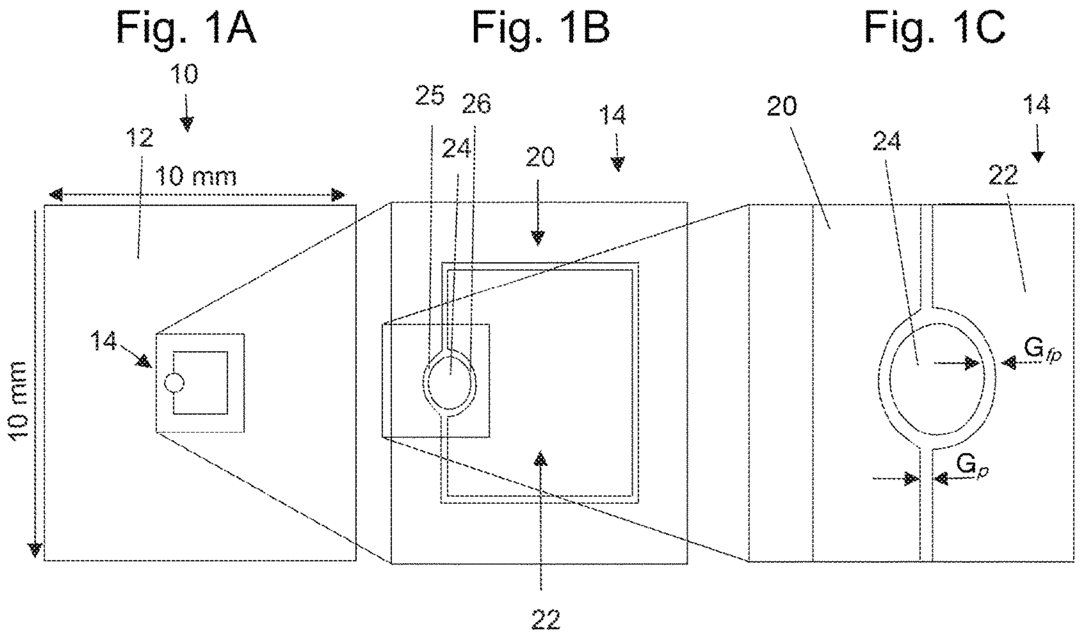
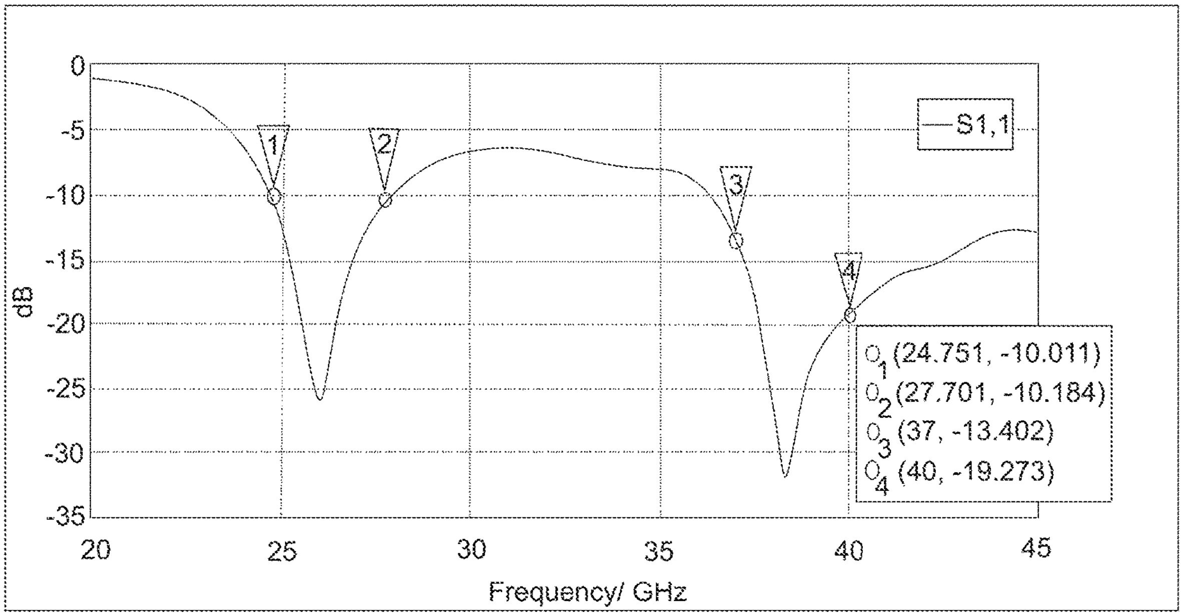
Fig. 2

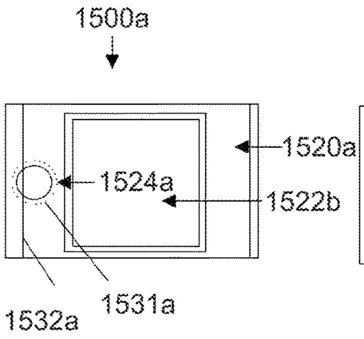
Fig. 15A
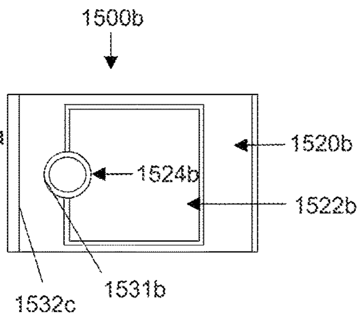
Fig. 15B
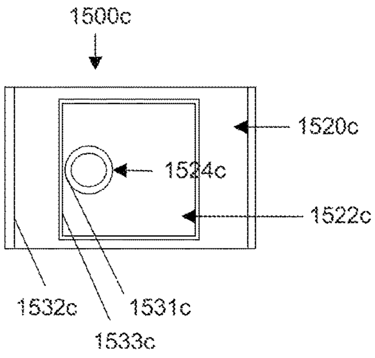
Fig. 15C
Fig. 16A
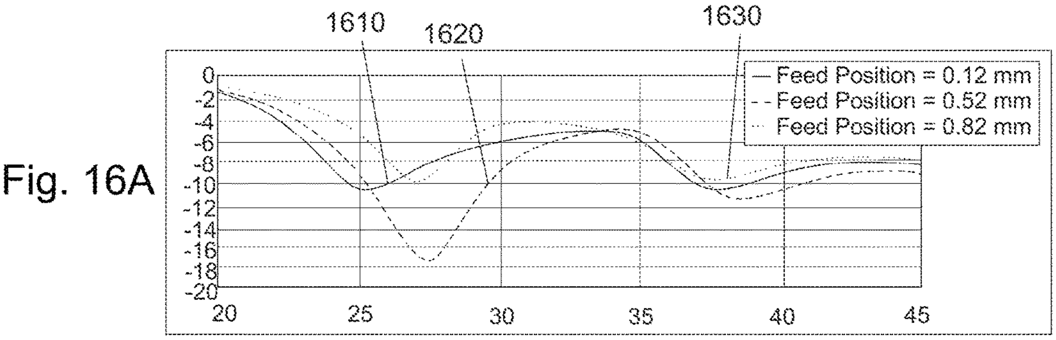
Fig. 16B
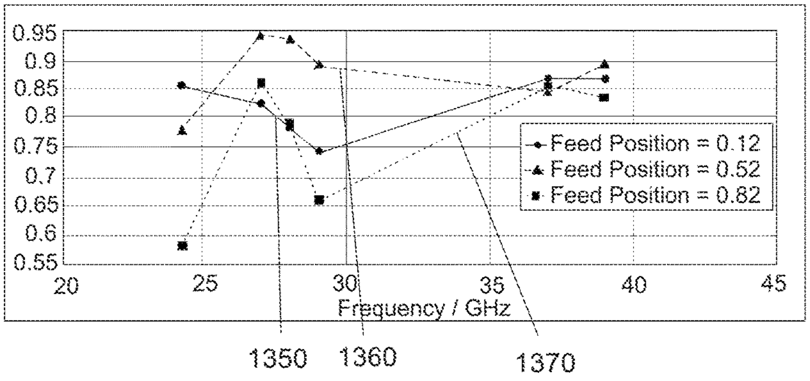

MULTIBAND PATCH ANTENNA

CROSS-REFERENCE TO RELATED APPLICATIONS

This application claims priority to European Application 20214956.3, filed on Dec. 17, 2020. The content of this earlier filed application is incorporated by reference herein in its entirety.

FIELD

Examples relate to concepts for patch antennas and particular to a method for forming a multiband patch antenna.

BACKGROUND

The usage of a dual polarized and dual band antenna may depend on several aspects of the antenna. For example, a wide impedance bandwidth in both the frequency bands, low cross-polarization or a better port-to-port isolation, just to name a few, may be important for a design of an antenna. Therefore, an antenna with matching characteristics may be desired.

BRIEF DESCRIPTION OF THE FIGURES

Some examples of apparatuses and/or methods will be described in the following by way of example only, and with reference to the accompanying figures, in which FIGS. 1A to 1C show a top view of a patch antenna;

FIG. 2 shows a magnitude of a S11 parameter of the patch antenna from FIG. 1 as a function of the frequency;

FIGS. 15A to 15C show a top view of another example of a patch antenna with different arranged feeding patches;

FIGS. 16A and 16B show simulations of a magnitude of a S11-parameter in db (FIG. 16*a*)) and a total efficiency (FIG. 16*b*)) as a function of the frequency for different arranged feeding patches from FIG. 15;

DETAILED DESCRIPTION

Figure 3A:
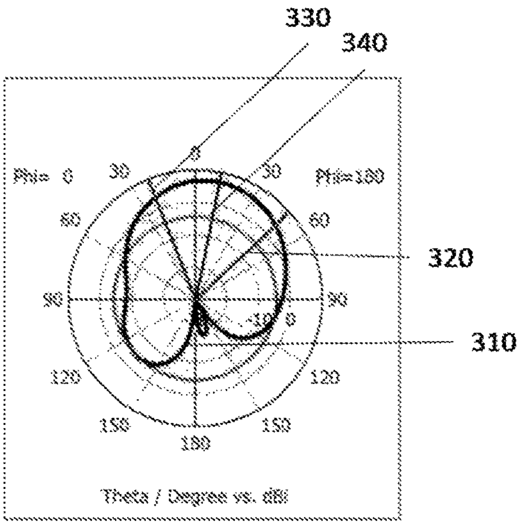
FIGS. 3A and 3B show a 2-D radiation pattern for 28 GHz of the patch antenna from FIG. 1.

Parameter to characterize a dual polarized and dual band antenna may be e.g., a wide impedance bandwidth in both the frequency bands, low cross-polarization, a better port-to-port isolation, directional radiation pattern without beam squint, high gain with good efficiency and/or a compact size, just to name a few. Available antenna designs may not meet above mentioned requirements in a single antenna. The antenna proposed herein may meet a plurality of mentioned parameters.

The patch antenna proposed herein may cover new radio (NR) FR2 bands, e.g., n257 (26.5 GHz-29.5 GHz), n258 (24.25 GHz-27.5 GHz), n261 (27.25 GHz-28.35 GHz) and n260 (37 GHz-40 GHz). There has been prior work on design of antennas for 5G millimeter-Wave (mm Wave) since the first 5G specification was released by 3GPP. For example, (A) Y. Rahayu, L. Fitria, Y. Hakiki and A. Kurniawan, "A New 2×4 Array Design of Dual-Band Millimeter-Wave Antenna for 5G Applications," 2018 International Workshop on Antenna Technology (iWAT), Nanjing, 2018, pp. 1-4.

(B) O. M. Haraz, M. M. Ashraf and S. Alshebili, "8×8 Patch antenna array with polarization and space diversity for future 5G cellular applications," 2015 International Conference on Information and Communication Technology Research (ICTRC), Abu Dhabi, 2015, pp. 258-261.

(C) M. Khalily, R. Tafazolli, P. Xiao and A. A. Kishk, "Broadband mm-Wave Microstrip Array Antenna With Improved Radiation Characteristics for Different 5G Applications," in IEEE Transactions on Antennas and Propagation, vol. 66, no. 9, pp. 4641-4647, September 2018.

(D) H. Xia, T. Zhang, L. Li and F. Zheng, "A low-cost dual-polarized 28 GHz phased array antenna for 5G communications," 2018 International Workshop on Antenna Technology (iWAT), Nanjing, 2018, pp. 1-4.

€ H. Aliakbari, A. Abdipour, R. Mirzavand, A. Costanzo and P. Mousavi, "A single feed dual-band circularly polarized millimeter-wave antenna for 5G communication," 2016 10th European Conference on Antennas and Propagation (EuCAP), Davos, 2016, pp. 1-5.

(F) M. Nosrati and N. Tavassolian, "A single feed dual-band, linearly/circularly polarized cross-slot millimeter-wave antenna for future 5G networks," 2017 IEEE International Symposium on Antennas and Propagation & USNC/URSI National Radio Science Meeting, San Diego, CA, 2017, pp. 2467-2468.

(G) J. Du et al., "Dual-polarized patch array antenna package for 5G communication systems," 2017 11th European Conference on Antennas and Propagation (EUCAP), Paris, 2017, pp. 3493-3496.

(H) N. Ashraf, O. Haraz, M. A. Ashraf and S. Alshebeili, "28/38-GHz dual-band millimeter wave SIW array antenna with EBG structures for 5G applications," 2015 International Conference on Information and Communication Technology Research (ICTRC), Abu Dhabi, 2015, pp. 5-8.

The design of a 2×4 array single-polarized dual-band slotted-patch antenna for 28 GHz and 38 GHz is described in (A). Though dual-band frequency response is achieved in Ref. (A) but it has very narrow bandwidth of 1.2 GHz and 1.5 GHz at 28 GHz and 38 GHz, respectively. In reference (B) an 8×8 patch antenna array having dual-linear polarized and spatial diversity is discussed for 28 GHz. The design has a pair of dual-linearly polarized patch antenna on multilayer substrate with a common ground layer. Stacked-patch antenna design approach for 28 GHz is used in (C) with 5 GHz impedance bandwidth and in (G) with 6 GHz impedance bandwidth. But the drawback in both the designs are that the antennas are only single polarized. Circularly polarized dual-band antennas for 28 GHz and 38 GHz using a single feed are discussed in (D), €. The beam squint issue in the radiation pattern is seen in €. A multi-layered dual-polarized antenna having a bandwidth of 2 GHz at 28 GHz is discussed in (F). SIW based dual-band antenna for 28 GHz and 38 GHz is discussed in (H) but it does not have dual-polarization. Polarization diversity can be achieved by physical placements of the antenna, but this would increase the number of antennas as compared to dual-polarized antenna thus taking up more space and increasing the costs and size.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of the group A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

FIG. 1 shows a top view of a patch antenna. FIG. 1*a*) shows the patch antenna 10. The patch antenna 10 may be a multiband patch antenna 10 comprising a ground layer 12 and an excitation layer 14. The excitation layer 14 comprise a first excitation patch 20, a second excitation patch 22 and a feeding patch 24. The feeding patch 24 is arranged to excite the first excitation patch 20 and the second excitation patch 22 simultaneously. With this patch antenna 10 a return loss characteristic (impedance matching) may be improved. By using a plurality of excitation patches 20, 22 an impedance matching may be improved. Furthermore, an antenna design may be compact and may occupy less space compared to prior arts.

An excitation patch may be an element to excite a material to radiate a signal. A radiation characteristic of an excitation patch may depend on a dimension of the excitation patch. The first excitation patch 20 may have a different dimension as the second excitation patch 22. Therefore, by using two different excitation patches a radiation characteristic may be improved. For example, the first radiation patch may have an impedance matching for a frequency of at least 22 GHz, at least 24 GHz or at least 26 GHz and/or for a frequency of at most 30 GHZ or at most 28 GHz. For example, the second radiation patch may have an impedance matching for a frequency of at least 34 GHz, at least 36 GHz or at least 38 GHz and/or for a frequency of at most 42 GHZ, at most 40 GHz or at most 39 GHz. Therefore, a proposed multiband patch antenna 10 may have an impedance matching for two frequencies and/or over a broader frequency range.

A feeding patch 24 may be an element to excite the excitation patches 20, 22. The feeding patch 24 may be used to proximity feed the first excitation patch 20 and the second excitation patch 22 simultaneously. An excitation of the excitation patches 20, 22 may belong to an arrangement of the feeding patch 24 with respect to the excitation patches 20, 22. For example, a feeding patch 24 arrangement between the first excitation patch 20 and the second excitation patch 24 may excite both excitation patches 20, 22 equally. Therefore, a return loss characteristic of a multiband patch antenna 10 formed by two excitation patches 20, 22 may depend on an arrangement of the feeding patch 24 (see also FIGS. 15 and 16).

For example, a proposed patch antenna 10 design may be a combination of an inner excitation patch 22 (second excitation patch) and an outer excitation patch 20 (first excitation patch), both the patches may be fed using another smaller circular feeding patch 24. The smaller circular feeding patch may couple proximately with the inner excitation patch 22 and the outer excitation patch 20.

In comparison to an aperture coupled antenna front to back ratio (FBR), gain and antenna efficiency may be improved by the proposed patch antenna 10. In comparison to dipole antenna, which may be single polarized antenna and for dual polarization, two dipoles antennas are required, the proposed patch antenna 10 may decrease an overall size of an antenna arrangement. In comparison to a dielectric resonator antenna a height to achieve a bandwidth may be decreased by the proposed patch antenna 10. In comparison to a substrate integrated waveguide antenna the proposed patch antenna 10 may improve a bandwidth.

FIG. 1*a*) shows the patch antenna 10. The patch antenna 10 comprises a ground layer 12 (also referred as Layer 4; L4) of size 10 mm×10 mm and a radiation and excitation layer 14 (also referred as Layer 2; L2) 14. A small circular portion of L4 12 may be etched away around a feed-probe, which acts as an anti-pad via in L4 12 (see FIG. 5 and FIG. 22).

FIG. 1*b*) shows the radiation and excitation layer 14 of FIG. 1*a*), comprising the first excitation patch 20, the second excitation 22 and the feeding patch 24. The feeding patch 24 may be arranged between the first 20 and the second excitation patch 22. The first 20 and the second excitation patch 22 may be rectangular, with a recess 25, 26 each, for the feeding patch 24. The recess 25, 26 for the first 20 and the second excitation patch 22 may be identical. For example, the feeding patch 24 may be arranged with a center between the first 20 and the second excitation patch 22. Therefore, an excitation of both excitation patches 20, 22 may be equally.

The feeding patch 24 may be arranged between the first excitation patch 20 and the second excitation patch 22. Thus, an excitation of the first 20 and the second excitation patch 22 may be improved by only one feeding patch 24. For example, the first 20 and the second excitation patch 22 may be excited with the same intensity by the feeding patch 24.

The second excitation patch may be enclosed by the first excitation patch. By enclosing the second excitation patch by the first excitation patch, a radiation characteristic of both patches may be adjustable, because both patches may interact in a desired way. For example, a center of the second excitation patch 24 may be arranged at a center of the first excitation patch 22. Therefore, the manufacturing process and/or the feeding may be improved and/or simplified.

FIG. 1*c*) shows an enlarged detail of the radiation and excitation layer 14 of FIGS. 1*a*) and 1*b*). The first 20 and the second excitation patch 22 may be separated by a separation gap $G_p$. The first 20 and the second excitation patch 22 may be separated from the feeding patch 24 by a feeding gap $G_{fp}$. $G_p$ and $G_{fp}$ may be important to achieve a balance between dual bands of the antenna (see also FIGS. 13 and 14). The value of $G_{fp}$ and $G_p$ may be e.g., 50 μm.

The separation gap $G_p$ between the first excitation patch 20 and the second excitation patch 22 may influence the impedance matching, e.g., for higher frequencies such a 39 GHz (see FIG. 13). The value of $G_p$ may be optimized to cover the frequency range 37-40 GHZ.

More details and aspects are mentioned in connection with the examples described below. The example shown in FIG. 1 may comprise one or more optional additional features corresponding to one or more aspects mentioned in connection with the proposed concept or one or more examples described below (e.g., FIG. 2-30).

FIG. 2 shows a magnitude of a S11 parameter of the patch antenna from FIG. 1 as a function of the frequency. The magnitude of the S11 210 shows two minima, roughly at 26 GHz and at 39 GHz. The return loss characteristic at 39 GHz may be dominated by the second excitation patch. An impact of the first excitation patch may be less important. Further, a return loss characteristic is shown for a 28 GHz bandwidth. The shape of a first at minima at 26 GHz may be dominated by the first excitation patch. Therefore, the characteristic of the first excitation patch may be in principal responsible for the first minima. The second minima at 39 GHz may be dominated by the second excitation patch. Therefore, the characteristic of the second excitation patch may be in principal responsible for the second minima. Thus, by combining the first and the second excitation patch a multiband patch antenna may be formed.

The excitation of the first and the second excitation patch with one feeding patch simultaneously, may improve and/or facilitate a manufacturing process. Therefore, a manufacturing process of a multiband patch antenna with desired characteristics may be simplified.

More details and aspects are mentioned in connection with the examples described above and/or below. The example shown in FIG. 2 may comprise one or more optional additional features corresponding to one or more aspects mentioned in connection with the proposed concept or one or more examples described above (e.g., FIG. 1) and/or below (e.g., FIG. 3-30).

Figure 3B:
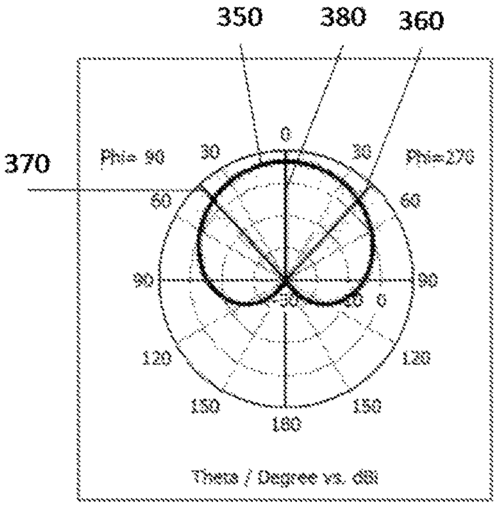

FIG. 3 shows a 2-D radiation pattern for 28 GHz of the patch antenna from FIG. 1. The farfield realized gain theta for the E-plane (Φ=0°) is shown in FIG. 3*a*) with graph 310 and for the H-plane (Φ=90°) in FIG. 3*b*) with graph 350. The main lobe magnitude may be 6.94 dB and 6.57 dB and the main lobe direction (indicated by 340 and 380) 12° and 0°, respectively. The angular width (at 3 dB) (indicated by 320/330 and 360/370) may be 69.3° and 85° and the side lobe level may be −11.4 dB and −35.9 dB, respectively.

More details and aspects are mentioned in connection with the examples described above and/or below. The example shown in FIG. 3 may comprise one or more optional additional features corresponding to one or more aspects mentioned in connection with the proposed concept or one or more examples described above (e.g., FIG. 1-2) and/or below (e.g., FIG. 4-30).

Figure 4A:
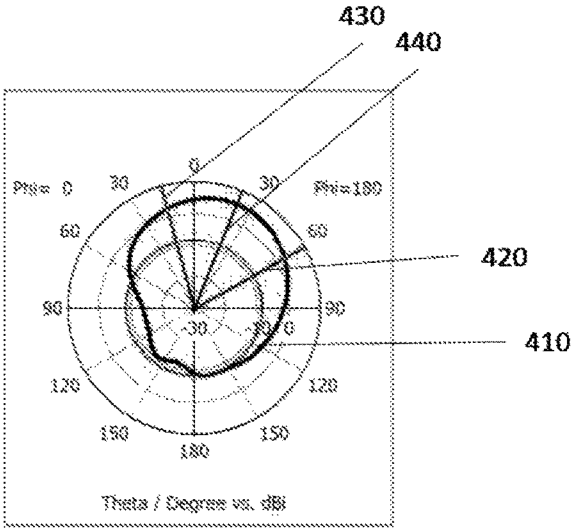
FIGS. 4A and 4B show a 2-D radiation pattern for 39 GHz of the patch antenna from FIG. 1.
Figure 4B:
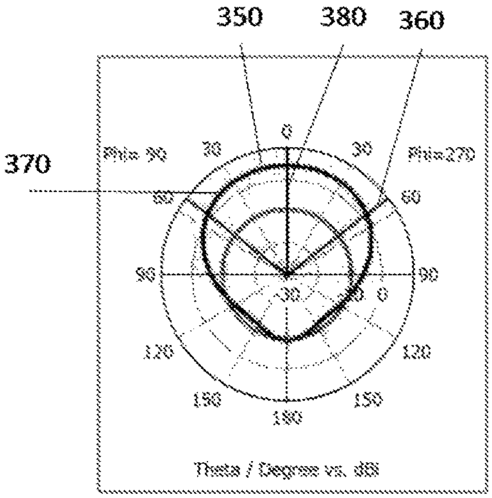

FIG. 4 shows a 2-D radiation pattern for 39 GHz of the patch antenna from FIG. 1. The farfield realized gain theta for the E-plane (Φ=0°) is shown in FIG. 4*a*) with graph 410 and for the H-plane (Φ=90°) in FIG. 4*b*) with graph 450. The main lobe magnitude may be 5.53 dB and 4.39 dB and the main lobe direction (indicated by 440 and 480) 22° and 0°, respectively. The angular width (at 3 dB) (indicated by 420/430 and 460/470) may be 76.6° and 105.8° and the side lobe level may be −14 dB and −13.7 dB, respectively.

More details and aspects are mentioned in connection with the examples described above and/or below. The example shown in FIG. 4 may comprise one or more optional additional features corresponding to one or more aspects mentioned in connection with the proposed concept or one or more examples described above (e.g., FIG. 1-3) and/or below (e.g., FIG. 5-30).

Figure 5:
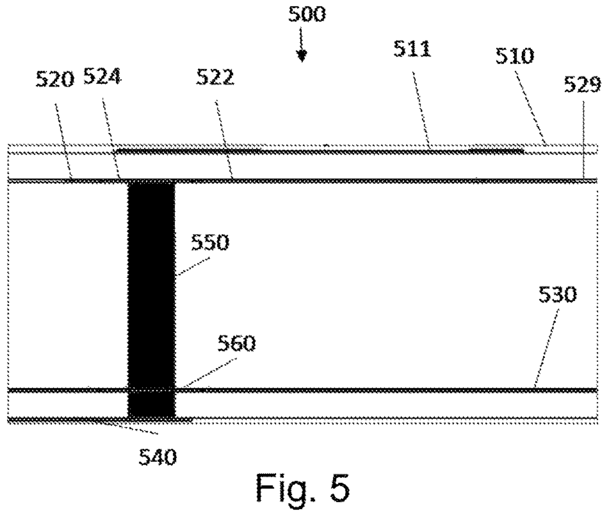
FIG. 5 shows a cross section of another example of a patch antenna.

FIG. 5 shows a cross section of another example of a patch antenna. The (multiband) patch antenna 500 may comprise a parasitic patch 511. The parasitic patch 511 may be arranged in a parasitic patch layer 510 (also referred as Layer 1; L1). The parasitic patch 511/parasitic patch layer 510 may be arranged on a top of the antenna 500. Below L1 510 may be L2 529. L2 529 may comprise a first 520 and a second excitation patch 522 and a feeding patch 524. The feeding patch 524 may be fed by a via 550, which may extend from a feeding layer 540 (also referred as Layer 5; L5) through an anti-pad 560 to the feeding patch 524. The anti-pad 560 may be arranged in L4 530. L4 530 may be arranged between L2 529 and L5 540. The parasitic patch 511 may be arranged in an upper layer of the excitation patches and may help to achieve wider frequency bands of the patch antenna.

The parasitic patch 511 may be placed over the example of the antenna described above in FIG. 1-4. L1 510 may be deposited on a Rogers RT 5880 layer, which may have a thickness of at most 0.35 mm, or at most 0.3 mm or at most 0.254 mm and/or at least 0.15 mm or at least 0.2 mm. The parasitic patch 511 may improve an impedance bandwidth for 28 GHz Band and may improve the gain of the antenna 500 at 39 GHz Band.

More details and aspects are mentioned in connection with the examples described above and/or below. The example shown in FIG. 5 may comprise one or more optional additional features corresponding to one or more aspects mentioned in connection with the proposed concept or one or more examples described above (e.g., FIG. 1-4) and/or below (e.g., FIG. 6-30).

Figure 6:
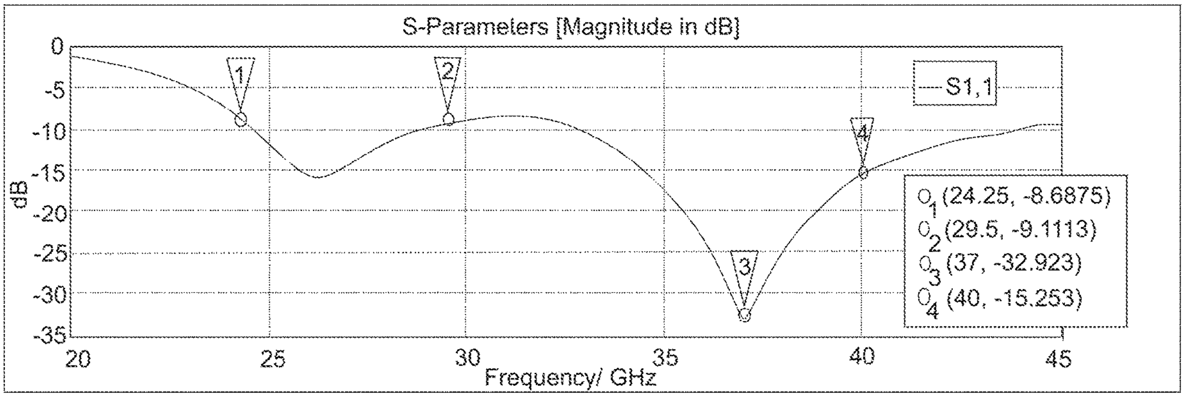
FIG. 6 shows a magnitude of a S11 parameter of the patch antenna from FIG. 5 as a function of the frequency.

FIG. 6 shows a magnitude of a S11 parameter of the patch antenna from FIG. 5 as a function of the frequency. The magnitude of the S11 610 may show a improved return loss characteristic. The antenna may show roughly a −10 dB return loss bandwidth starting from 24.25 GHz to 29.5 GHz and from 37 GHz to 40 GHz (see points 1-4 in comparison to FIG. 2). Therefore, the return loss characteristic of the antenna 500 may be improved by the parasitic patch 511.

More details and aspects are mentioned in connection with the examples described above and/or below. The example shown in FIG. 6 may comprise one or more optional additional features corresponding to one or more aspects mentioned in connection with the proposed concept or one or more examples described above (e.g., FIG. 1-5) and/or below (e.g., FIG. 7-30).

Figure 7A:
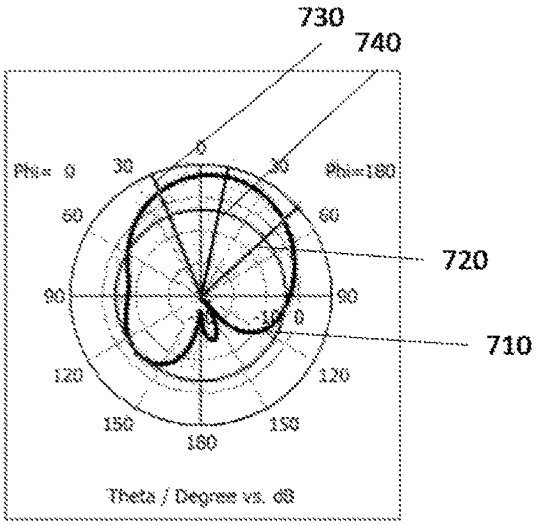
FIGS. 7A and 7B show a 2-D radiation pattern for 28 GHz of the patch antenna from FIG. 5.
Figure 7B:
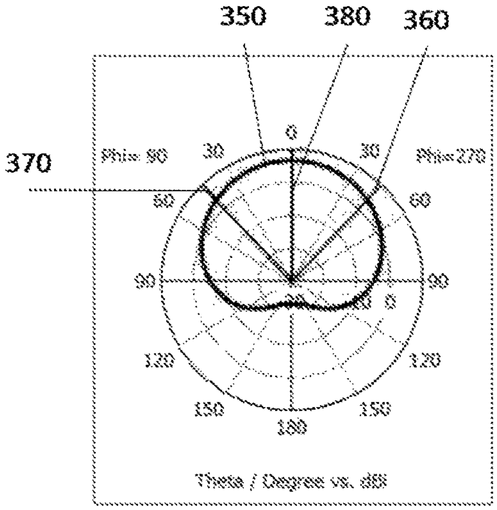

FIG. 7 shows a 2-D radiation pattern for 28 GHz of the patch antenna from FIG. 5. The far-field realized gain theta for the E-plane (Φ=0°) is shown in FIG. 7*a*) and for the H-plane (Φ=90°) in FIG. 7*b*). The main lobe magnitude may be 7.03 dB and 6.65 dB and the main lobe direction (indicated by 740 and 780) 12° and 0°, respectively. The angular width (at 3 dB) (indicated by 720/730 and 760/770) may be 69.8° and 85.9°, respectively and the side lobe level may be −10.9 dB for the E-plane.

More details and aspects are mentioned in connection with the examples described above and/or below. The example shown in FIG. 7 may comprise one or more optional additional features corresponding to one or more aspects mentioned in connection with the proposed concept or one or more examples described above (e.g., FIG. 1-6) and/or below (e.g., FIG. 8-30).

Figure 8A:
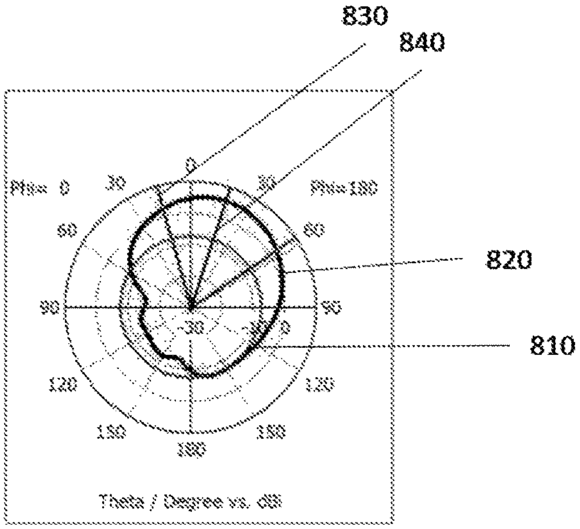
FIGS. 8A and 8B show a 2-D radiation pattern for 39 GHz of the patch antenna from FIG. 5.
Figure 8B:
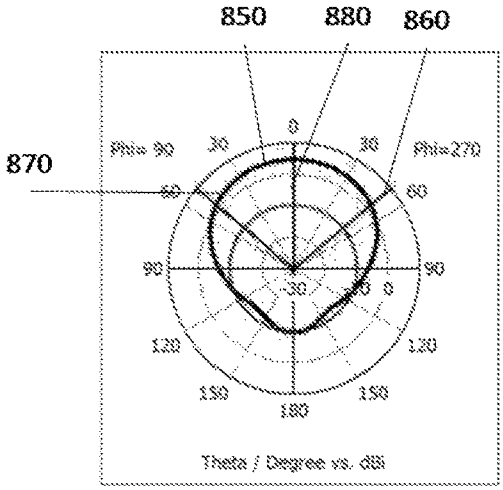

FIG. 8 shows a 2-D radiation pattern for 39 GHz of the patch antenna from FIG. 5. The far-field realized gain theta for the E-plane (Φ=0°) is shown in FIG. 8*a*) and for the H-plane (Φ=90°) in FIG. 8*b*). The main lobe magnitude may be 5.62 dB and 4.69 dB and the main lobe direction (indicated by 840 and 880) 18° and 0°, respectively. The angular width (at 3 dB) (indicated by 820/830 and 860/870) may be 72.1° and 101° and the side lobe level may be −13.1 dB and −14.4 dB, respectively.

Thus, an antenna gain and a beam squint issue may be not negative influenced by the parasitic patch.

More details and aspects are mentioned in connection with the examples described above and/or below. The example shown in FIG. 8 may comprise one or more optional additional features corresponding to one or more aspects mentioned in connection with the proposed concept or one or more examples described above (e.g., FIG. 1-7) and/or below (e.g., FIG. 9-30).

Figure 9:
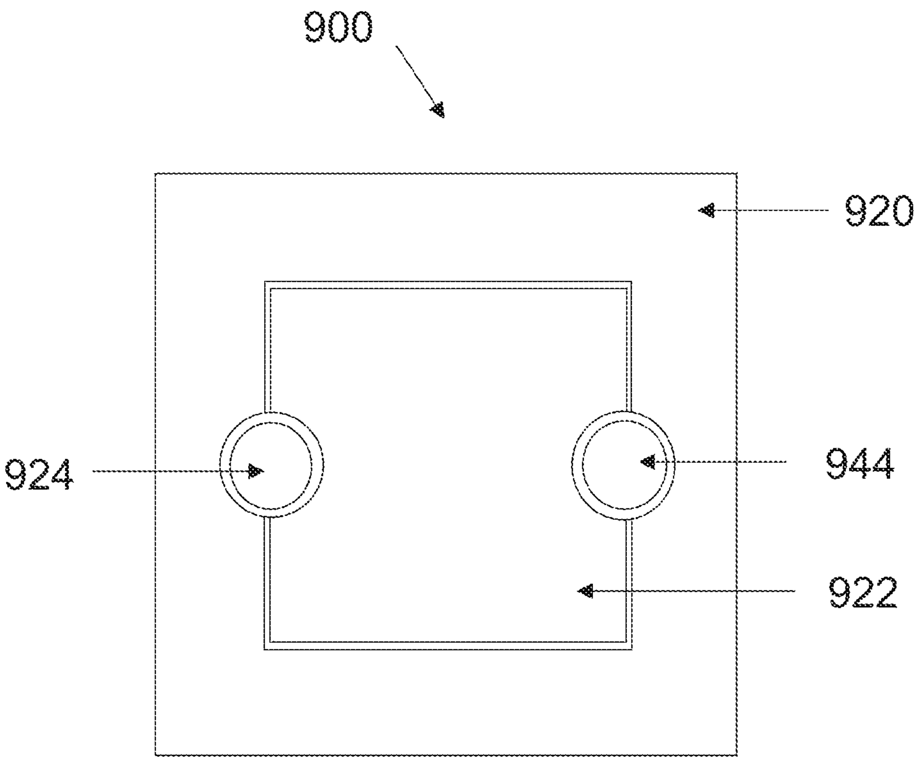
FIG. 9 shows a top view of another example of a patch antenna.

FIG. 9 shows a top view of another example of a patch antenna. The antenna 900 may further comprise a second feeding patch 944. The antenna 900 may further comprise a feeding patch 924 and a first 920 and a second excitation patch 922. The second feeding patch 944 may reduce a beam squint. The feeding patch 924 and the second feeding patch 944 may be arranged at opposite edges of the excitation patches 20, 22. Thus, a balanced feed may be achieved and may reduce a beam squint.

The feeding patch 924 and the second feeding patch 944 are arranged on opposite edges of the second excitation patch 922. Due to a symmetric of antenna 900 a beam squint may be reduced. Optionally, a first phase for feeding the feeding patch 920 may have a phase difference to a second phase for feeding the second feeding patch 944. For example, the second feeding patch 944 may have be fed with a phase difference of 180° in comparison to a phase of the first feeding patch 924. Thus, a balanced feed may be achieved and a beam squint may be further reduced.

The patch antenna may comprise a first feeding network for the feeding patch 924 and the second feeding patch 944, wherein the first feeding network may be a balanced feeding network. The balanced feeding network may have a phase difference of 180°. Due to a symmetric of antenna 900 a beam squint may be reduced.

More details and aspects are mentioned in connection with the examples described above and/or below. The example shown in FIG. 9 may comprise one or more optional additional features corresponding to one or more aspects mentioned in connection with the proposed concept or one or more examples described above (e.g., FIG. 1-8) and/or below (e.g., FIG. 10-30).

Figure 10:
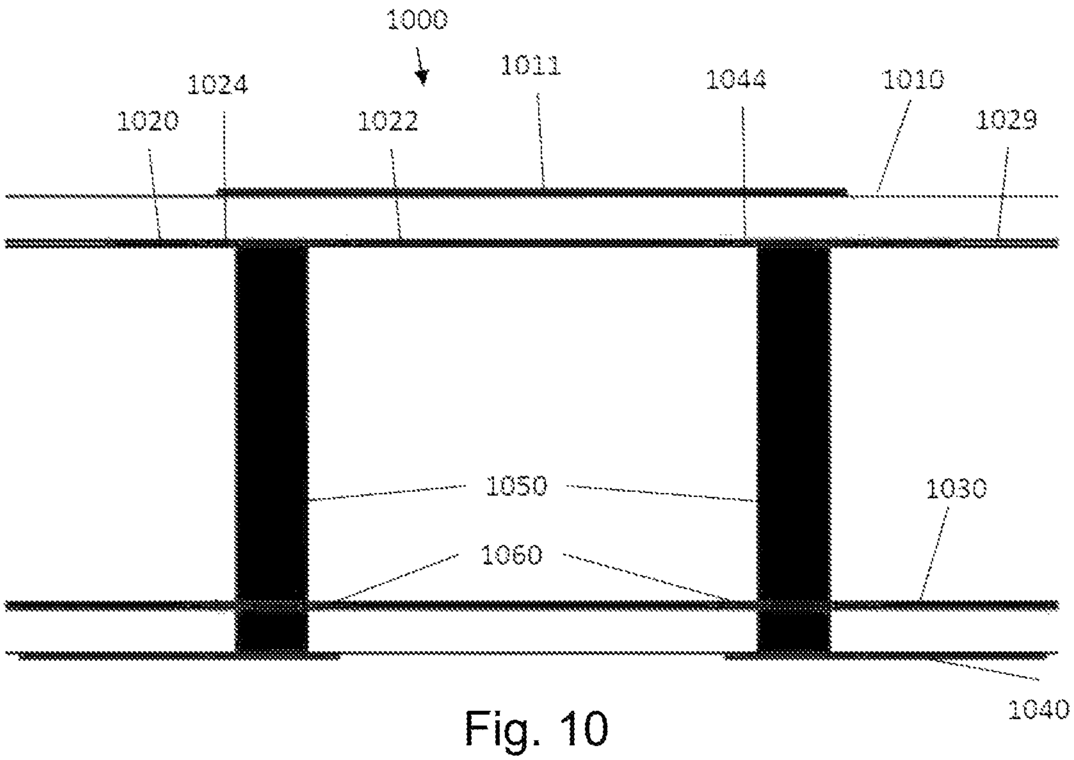
FIG. 10 shows a cross section of the patch antenna from FIG. 9.

FIG. 10 shows a cross section of the patch antenna from FIG. 9. The patch antenna 1000 may comprise a parasitic patch 1011. The parasitic patch 1011 may be arranged in a parasitic patch layer 1010. The parasitic patch 1011/parasitic patch layer 1010 may be arranged on a top of the patch antenna 1000. Below L1 1010 L2 1029 may be arranged. L2 1029 may comprise a first 1020 and a second excitation patch 1022, a feeding patch 1024 and a second feeding patch 1044. The feeding patch 1024 and the second feeding patch 1044 may be fed each by a via 1050, which may extend from L5 1040 through an anti-pad 1060 each, to the feeding patch 1024 and the second feeding patch 1044, respectively. The anti-pad 1060 may be arranged in L4 1030. L4 1030 may be arranged between L2 1029 and L5 1040.

More details and aspects are mentioned in connection with the examples described above and/or below. The example shown in FIG. 10 may comprise one or more optional additional features corresponding to one or more aspects mentioned in connection with the proposed concept or one or more examples described above (e.g., FIG. 1-9) and/or below (e.g., FIG. 11-30).

FIG. 11 shows a 2-D radiation pattern for 28 GHz of the patch antenna from FIG. 9. The far-field realized gain theta for the E-plane (Φ=0°) is shown in FIGS. 11*a*), *c*) and *e*) (1110*a*, 1110*c*, 1110*e*) and for the H-plane (Φ=90°) in FIGS. 11*b*), *d*) and *f*) (1110*b*, 1110*d*, 1110*f*). In FIGS. 11*a*) and *b*) a phase difference between the excitation of the two patches may be ΔΦ=0°. Thus, both edges of the antenna will experience a same potential, which may cause E-field repulsion towards the center, which may yield to a null radiation in a broadside direction) (ϑ=0°). Therefore, a radiation pattern 1110*a*, 1110*b* may be unfavorable influenced by a phase difference of 0°. The main lobe magnitude may be 0.609 dB and 2.85 dB and the main lobe direction 46° and 45°, respectively. The angular width (at 3 dB) (indicated by 1120*a*/1130*a* and 1120*b*/1130*b*) may be 59.7° and 58.2° and the side lobe level may be −7.4 dB and −6.9 dB, respectively.

Figure 11A:
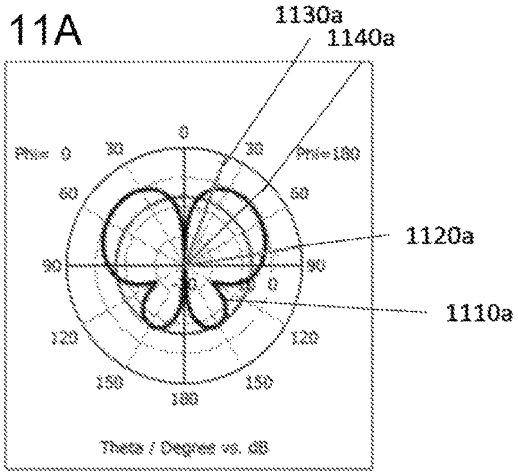
FIGS. 11A to 11F show a 2-D radiation pattern for 28 GHz of the patch antenna from FIG. 9.
Figure 11B:
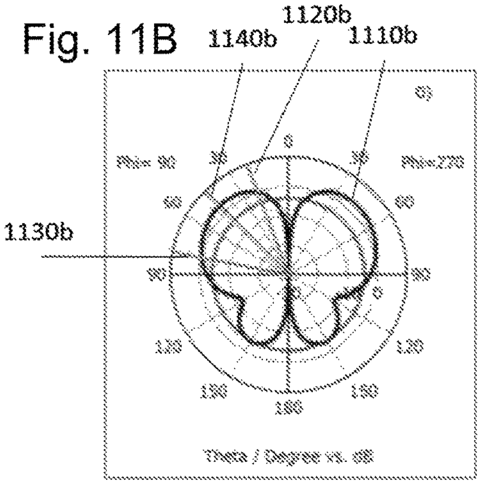
Figure 11C:
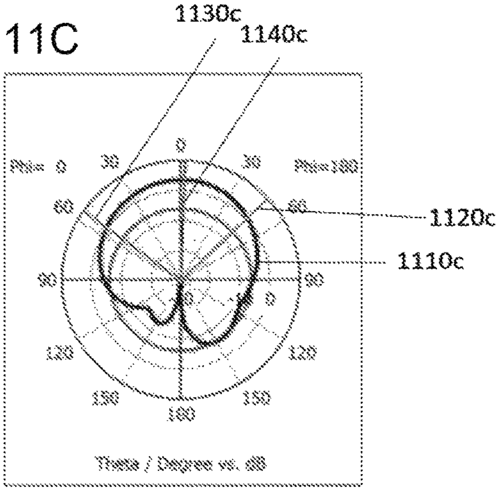
Figure 11D:
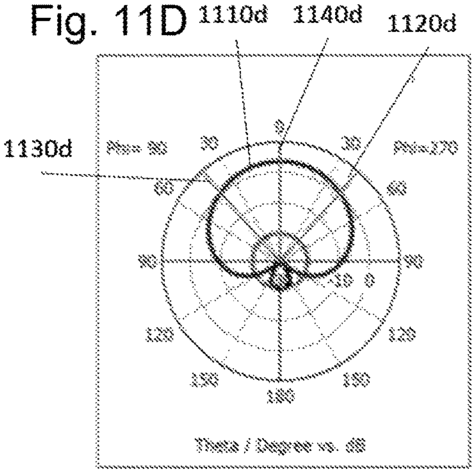

In FIG. 11*c*) and d) a phase difference between the excitation of the two patches may be ΔΦ=90°, e.g., phase at first excitation patch 0° and phase at second excitation patch 90°. So, only half of the power my be added at broadside. Thus, a 90° phase difference may avoid the null radiation at the broadside and may improve the radiation pattern 1110*c*, 1110*d* by adding half power towards the broadside direction) (ϑ=0°). The main lobe magnitude may be 3.52 dB and 3.52 dB and the main lobe direction 2° and 0°, respectively. The angular width (at 3 dB) (indicated by 1120*c*/1130*c* and 1120*d*/1130*d*) may be 101.5° and 81.9° and the side lobe level may be −9.6 dB and −24.2 dB, respectively.

Figure 11E:
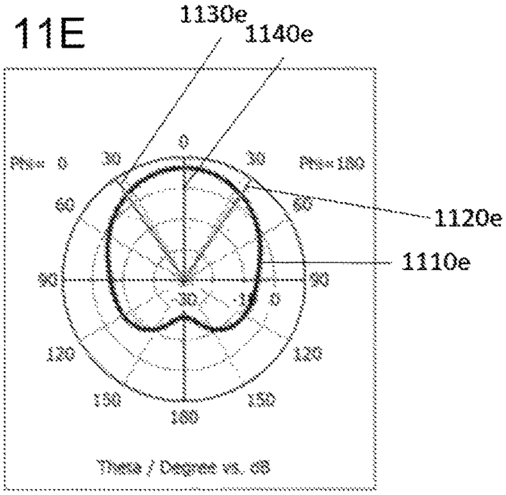
Figure 11F:
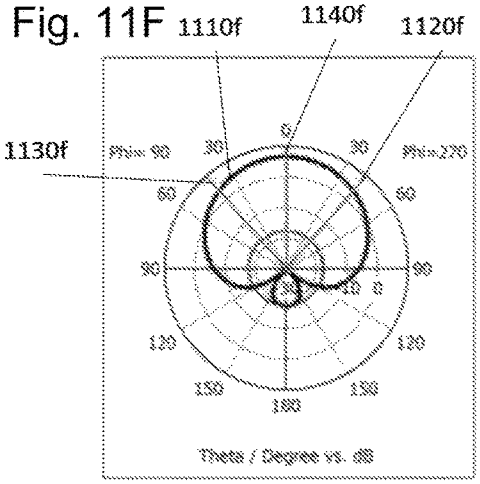

In FIGS. 11*e*) and *f*) a phase difference between the excitation of the two patches may be ΔΦ=180°, e.g., phase at first excitation patch 0° and phase at second excitation patch 180°. So, the excitation patches may be out-of-phase (balanced feed). Thus, a 180° phase difference at both edges of the antenna may lead to an opposite polarity and equal amplitude, which may attract the E-fields of the excitation patches. These E-fields may be added and provide a maximum radiation power at the broadside)(ϑ=0°). Thus, a 180° phase difference may improve the radiation pattern 1110*e*, 1110*f*. The main lobe magnitude may be 6.53B and 6.53 dB and the main lobe direction 0° and 0°, respectively. The angular (at 3 dB) width (given by 1120*e* and 1130*e* and 1120*f* and 1130*f*) may be 68.3° and 81.9°, respectively and the side lobe level may be −24.2 dB for the H-plane. Therefore, a second excitation patch may improve the radiation pattern of the E-plane of the antenna.

The main lobe direction for the E-plane (1140*a*, 1140*c*, 1140*e*) may shift to the broadside direction for an increasing phase difference. The main lobe direction for the H-plane (1140*b*, 1140*d*, 1140*f*) also may shift for an increasing phase difference towards the broadside direction.

More details and aspects are mentioned in connection with the examples described above and/or below. The example shown in FIG. 11 may comprise one or more optional additional features corresponding to one or more aspects mentioned in connection with the proposed concept or one or more examples described above (e.g., FIG. 1-10) and/or below (e.g., FIG. 12-30).

FIG. 12 shows a 2-D radiation pattern for 39 GHz of the patch antenna from FIG. 9. The far-field realized gain theta for the E-plane (Φ=0°) is shown in FIGS. 12*a*), *c*) and *e*) and for the H-plane (Φ=90°) in FIGS. 12*b*), *d*) and *f*). In FIGS. 12*a*) and *b*) a phase difference between the excitation of the two patches may be ΔΦ=0°. In FIGS. 12*c*) and *d*) a phase difference between the excitation of the two patches may be ΔΦ=90°, e.g., phase at first excitation patch 0° and phase at second excitation patch 90°. In FIGS. 12*e*) and *f*) a phase difference between the excitation of the two patches may be ΔΦ=180°, e.g., phase at first excitation patch 0° and phase at second excitation patch 180°. Similar to FIG. 11, the main lobe direction for the E-plane (FIG. 12*a*): 52°, 1240*a*; FIG. 12*c*): 2°, 1240*c*; FIG. 12*e*): 0°, 1240*e*)) may shift to the broadside direction for an increasing phase difference. The main lobe direction for the H-plane (FIG. 12*b*): 44°, 1240*a*; FIG. 12*d*): 0°, 1240*d*; FIG. 12*f*): 0°, 1240*f*)) also may shift for an increasing phase difference towards the broadside direction. Therefore, a second excitation patch may improve the radiation pattern of the E-plane and the H-plane of the antenna.

Figure 12A:
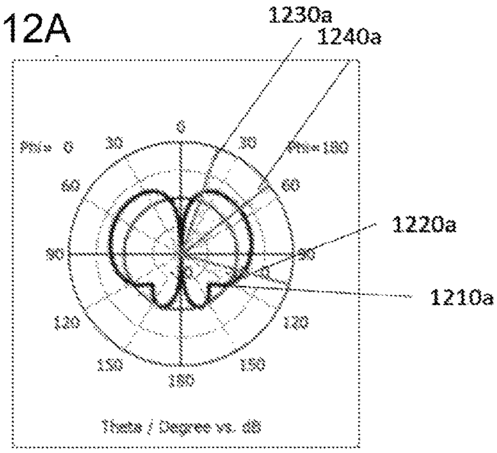
FIGS. 12A to 12F show a 2-D radiation pattern for 39 GHz of the patch antenna from FIG. 9.
Figure 12B:
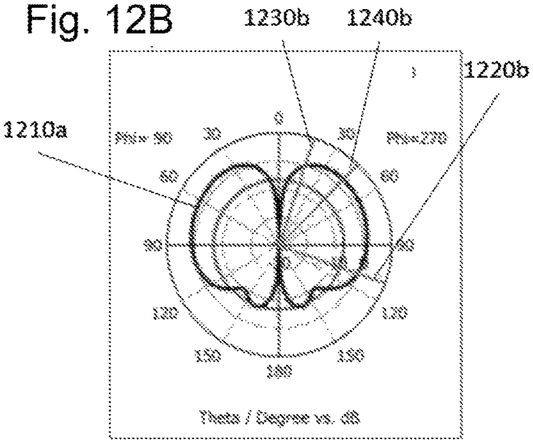
Figure 12C:
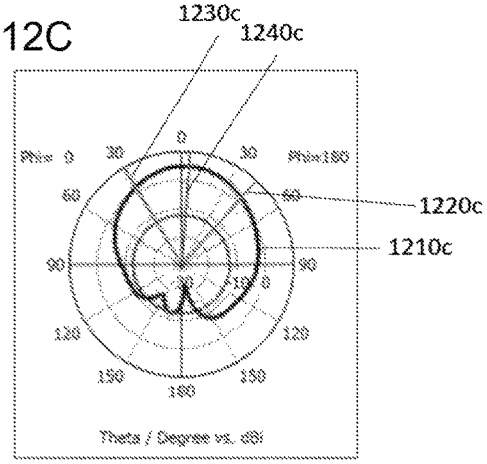
Figure 12D:
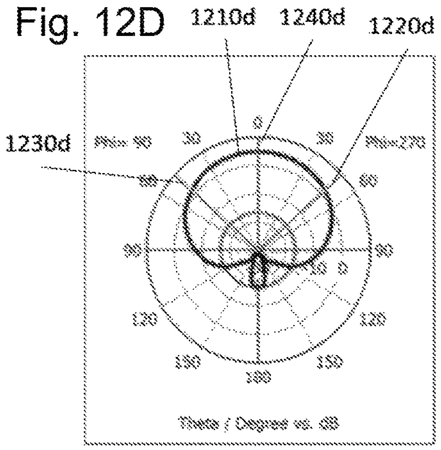
Figure 12E:
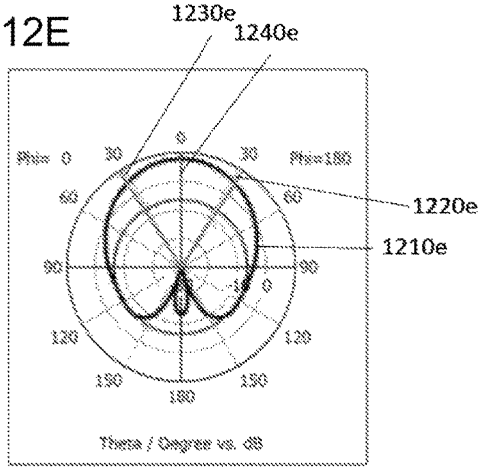
Figure 12F:
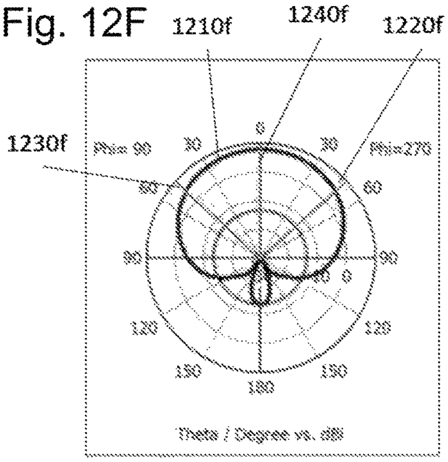

In FIGS. 12*a*) and *b*) the angular width (at 3 dB) (indicated by 1220*a*/1230*a* and 1220*b*/1230*b*) may be 86.5° and 91.8° and the side lobe level may be −6.1 dB and −9.2 dB, respectively. The side lobe level may be −6.1 dB and −9.2 dB, respectively. In FIGS. 12*c*) and *d*) the angular width (at 3 dB) (indicated by 1220*c*/1230*c* or 1220*d* and 1230*d*) may be 72.9° and 96.4° and the side lobe level may be −6.1 dB and −9.2 dB, respectively. The side lobe level may be −17.3 dB and −21.4 dB, respectively. In FIGS. 12*c*) and *d*) the angular width (at 3 dB) (indicated by 1220*e*/1230*e* or 1220*f*/1230*f*) may be 65.8° and 96.4° and the side lobe level may be −6.1 dB and −9.2 dB, respectively. The side lobe level may be −14.3 dB and −21.4 dB, respectively.

The main lobe magnitude increases for an increasing phase difference. The main lobe magnitude is summarized in Tab. 1 for the FIGS. 11 and 12. The antenna may have a maximum gain in the broadside if the phase difference may be ΔΦ=180°.

TABLE 1

| Broadside gain for different phase difference DF between the two excitation patches. | | | | |
|---|---|---|---|---|
| | broadside gain (dbBi) (main lobe magnitude) | | | |
| phase | 28 GHz | | 39 GHz | |
| difference | Φ = 0° | Φ = 90° | Φ = 0° | Φ = 90° |
| 0 | 0 (FIG. 11a)) | 0 (FIG. 11b)) | 0 (FIG. 12a)) | 0 (FIG. 12b) |
| 90 | 3.52 (FIG. 11c)) | 3.52 (FIG. 11d)) | 4.78 (FIG. 12c) | 4.78 (FIG. 12d)) |
| 180 | 6.53 (FIG. 11e)) | 6-53 (FIG. 11f)) | 7.79 (FIG. 12e) | 7.79 (FIG. 12f)) |

More details and aspects are mentioned in connection with the examples described above and/or below. The example shown in FIG. 12 may comprise one or more optional additional features corresponding to one or more aspects mentioned in connection with the proposed concept or one or more examples described above (e.g., FIG. 1-11) and/or below (e.g., FIG. 13-30).

Figure 13A:
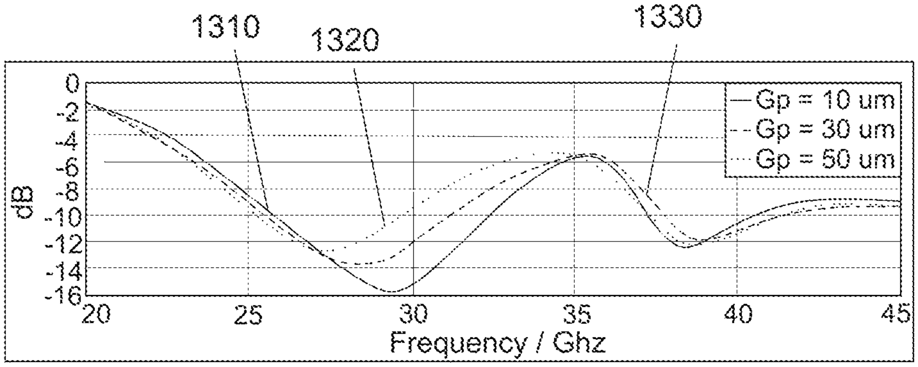
FIGS. 13A and 13B shows simulations of a magnitude of a S11-parameter in db (FIG. 13*a*)) and a total efficiency (FIG. 13*b*)) as a function of the frequency for different separation gaps.
Figure 13B:
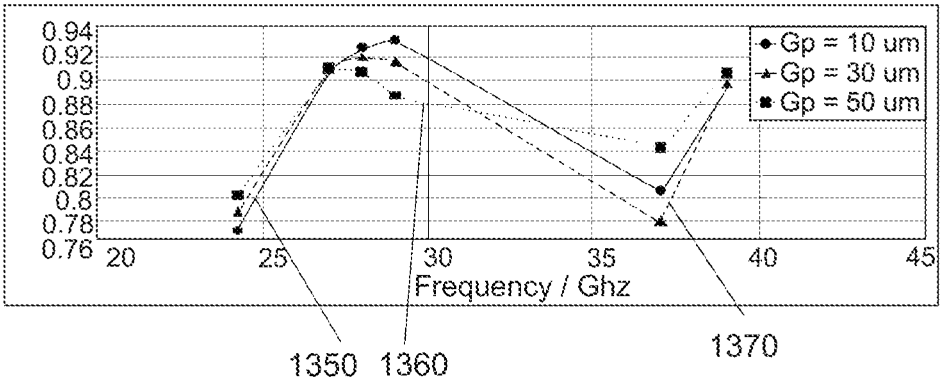

FIG. 13 shows simulations of a magnitude of a S11-parameter in db (impedance matching, see FIG. 13*a*)) and a total efficiency (FIG. 13*b*)) as a function of the frequency for different separation gaps. The feeding gap is $G_{fp}$=50 μm. FIGS. 13*a*) and 13*b*) show an effect of the separation gap ($G_p$) between the first and the second radiation patch on the S11-parameter and hence on the total efficiency, respectively. The S11-parameter is shown in FIG. 13*a*) for three different width of the separation gap, for $G_p$=10 μm (1310), 30 μm (1320) or 50 μm (1330). For the simulation an outer dimension of the first excitation patch and an area of the second excitation patch are kept constant. So, an increasing width of the separation gap $G_p$ leads to a decrease of an area of the first excitation patch. Therefore, an observed influence on the return loss characteristic may be stronger for the minima caused by the first excitation patch. This can be seen for the comparison between the graph 1310, 1320 and 1330. The graph with the narrowest width of the separation gap 1310 shows the best return loss characteristic for the first minima at lower frequency. For an increasing separation gap the minima may shift to smaller frequencies (compare graph 1320 and 1330) and also the bandwidth of the minima decreases.

For the second minima at higher frequency an impact of the width of the separation gap may be less important as for the first minima. Further, there may be no trend in a change of the return loss characteristic for an increasing width of the separation gap. For $G_p$=30 μm (1320) the second minima may shift to higher frequency in comparison to $G_p$=10 μm (1310) and for $G_p$=50 μm (1330) the second minima may shift to lower frequency in comparison to graph 1310. Also, for a change of the bandwidth at the second minima there may be no trend in a change of the return loss characteristic perceptible. Thus, a decreasing of the separation gap may improve a return loss characteristic for the first minima without deteriorating the return loss characteristic for the second minima.

For example, a similar effect can be seen at FIG. 13*b* for a magnitude of the total efficiency. Graph 1350 with $G_p$=10 μm shows an improved efficiency in comparison to the other graph 1360 with $G_p$=30 μm and graph 1360 $G_p$=50 μm for the first minima at lower frequency. Also, the bandwidth of the first minima increases for a decreasing separation gap. The total efficiency for the second minima at higher frequency shows an improved efficiency for the widest separation gap (see graph 1370). The improved total efficiency may be achieved because the increased width of the separation gap may lead to an increased air gap between the first and the second excitation patch, and therefore the efficiency of the second excitation patch may be improved due to less interaction with the first excitation patch. Thus, for the second minima an increase of the separation gap may be advantageously.

Therefore, there may be a trade-off between the total efficiency for the first minima, caused by the first excitation patch and the second minima, caused by the second excitation patch. So, a desired design for the separation gap may depend on a case of application. A return loss characteristic of an antenna proposed above may be chosen in a desired way by adjusting the separation gap between the first and the second excitation patch.

A distance between the first excitation patch and the second excitation patch may be at most 16 μm, at most 14 μm, at most 12 μm or at most 10 μm.

More details and aspects are mentioned in connection with the examples described above and/or below. The example shown in FIG. 13 may comprise one or more optional additional features corresponding to one or more aspects mentioned in connection with the proposed concept or one or more examples described above (e.g., 1-FIG. 12) and/or below (e.g., FIG. 14-30).

Figure 14A:
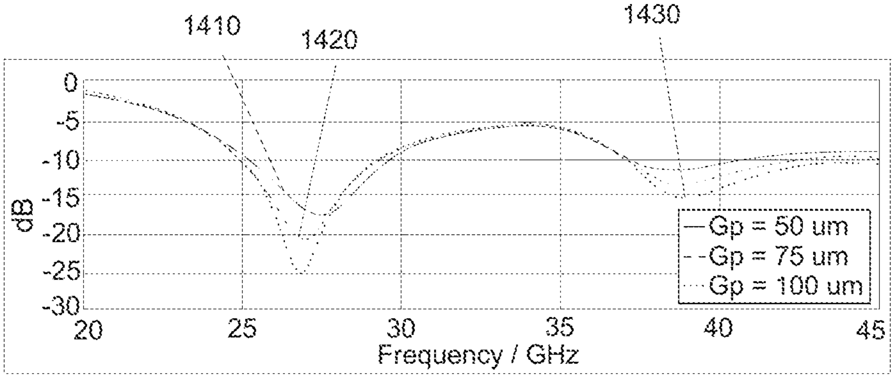
FIGS. 14A and 14B shows simulations of a magnitude of a S11-parameter in db (FIG. 14*a*)) and a total efficiency (FIG. 14*b*)) as a function of the frequency for different excitation gaps.
Figure 14B:
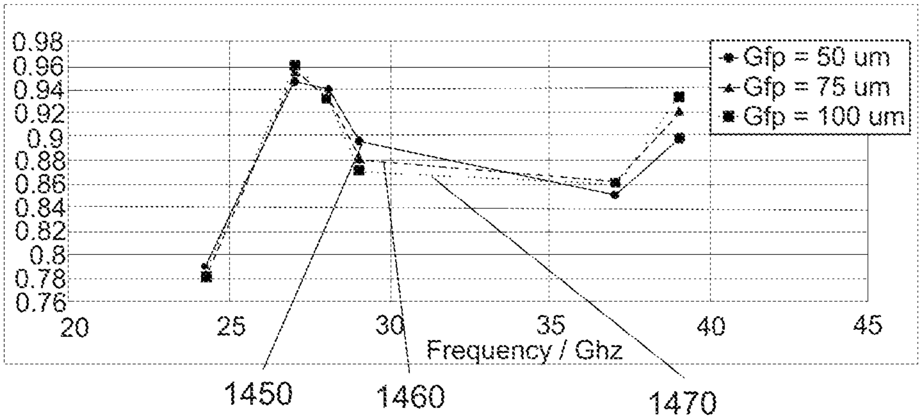

FIG. 14 shows simulations of a magnitude of a S11-parameter in db (impedance matching, see FIG. 14*a*)) and a total efficiency (FIG. 14*b*)) as a function of the frequency for different feeding gaps. The separation gap is $G_p$=10 μm. FIG. 14*a*) and FIG. 14*b*) show an effect of the feeding gap ($G_{fp}$) between the excitation patch and the first and the second radiation patch on the S11-parameter and hence on the total efficiency, respectively.

The S11-parameter is shown in FIG. 14*a*) for three different width of the feeding gap, for $G_{fp}$=50 μm (1410), 75 μm (1420) or 100 μm (1430). For the first minima at lower frequency the return loss characteristic increases for an increasing width of the feeding gap. Furthermore, the bandwidth of the first minimum slightly decreases with an increasing width of the feeding gap. This slight decrease for the return loss characteristics (at 28 GHz band) may show a trade-off between impedance matching and bandwidth. Also, the return loss characteristic for the second minima at higher frequency increases with increasing feeding gap. Therefore, a return loss characteristic may be improved by increasing the feeding gap.

For example, a similar effect can be seen at FIG. 14*b* for a magnitude of the total efficiency. Graph 1470 with $G_{fp}$=100 μm shows an improved efficiency in comparison to the other graph 1450 with $G_{fp}$=40 μm and graph 1460 $G_{fp}$=75 μm for the first minima at lower frequency and the second minima at higher frequency. Also, the bandwidth of the first minimum slightly decreases with an increasing width of the feeding gap. The improved total efficiency may be achieved because the increased width of the feeding gap leads to an increased air gap between the first and the second excitation patch besides the excitation patch, and therefore the efficiency of the first excitation patch and the second excitation patch may be improved due to less interaction with each other. Thus, for the total efficiency an increase of the feeding gap may be advantageously.

Furthermore, there may be a trade-off between the total efficiency (impedance matching) for the first minima, and the bandwidth of the first minima. So, a desired design for the feeding gap may depend on a case of application. A return loss characteristic of an antenna proposed above may be chosen by adjusting the feeding gap between the first and the second excitation patch.

A distance between the feeding patch and the first excitation patch and/or the second excitation patch may be at least 70 μm, at least 80 μm, at least 90 μm, or at least 100 μm.

More details and aspects are mentioned in connection with the examples described above and/or below. The example shown in FIG. 14 may comprise one or more optional additional features corresponding to one or more aspects mentioned in connection with the proposed concept or one or more examples described above (e.g., 1-FIG. 13) and/or below (e.g., FIG. 15-30).

FIG. 15 shows a top view of another example of a patch antenna with different arranged feeding patches. In FIG. 15*a*) the feeding patch 1524*a* of a patch antenna 1500*a* may be arranged with an outermost point 1531*a* in a distance of 0.12 mm to an edge 1532*a* of the first excitation patch 1520*a* and may be separated by from the second excitation patch 1522*a* by the first excitation patch 1520*a*. In FIG. 15*b*) the feeding patch 152*b* of a patch antenna 1500*b* may be arranged with an outermost point 1531*b* in a distance of 0.12 mm to an edge 1532*b* of the first excitation patch 1520*b*. For example, a center of the feeding patch 1524*b* may be arranged between the first excitation patch 1520*b* and the second excitation patch 1522*b*. Thus, the feeding patch 1524*b* may be equally shared by both excitation patches 1520*b*, 1522*b*. In FIG. 15*c*) the feeding patch 152*bc* of a patch antenna 1500*c* may be arranged with an outermost point 1531*c* in a distance of 0.182 mm to an edge 1532*c* of the first excitation patch 1520*c*. For example, the outermost point 1531*c* of the feeding patch 1524*c* may be arranged at an edge 1533*c* of the second excitation patch 1522*c*.

More details and aspects are mentioned in connection with the examples described above and/or below. The example shown in FIG. 15 may comprise one or more optional additional features corresponding to one or more aspects mentioned in connection with the proposed concept or one or more examples described above (e.g., 1-FIG. 14) and/or below (e.g., FIG. 16-30).

FIG. 16 shows simulations of a magnitude of a S11-parameter in db (FIG. 16*a*)) and a total efficiency (FIG. 16*b*)) as a function of the frequency for different arranged feeding patches from FIG. 15.

FIG. 16*a*) and FIG. 16*b*) show an effect of the arrangement of the feeding patch on the S11-parameter and hence on the total efficiency, respectively.

The S11-parameter is shown in FIG. 16*a*) for three different arrangements of the feeding patch. The feeding patch may be arranged with an outermost point in a distance of 0.12 mm (1610), 0.52 mm (1620) or 0.82 mm (1630) to an edge of the first excitation patch. For graph 1620 the return loss characteristic may be improved in comparison to graph 1610 and 1630. Thus, an arrangement of the feeding patch between both excitation patches may improve an impedance matching. This may be because the feeding patch may couple to both of the excitation patches.

For example, a similar effect can be seen at FIG. 16*b* for a magnitude of the total efficiency. The feeding patch may be arranged with an outermost point in a distance of 0.12 mm (1650), 0.52 mm (1660) or 0.82 mm (1670) to an edge of the first excitation patch. Graph 1660—feeding patch may be arranged between both excitation patches—shows an improved efficiency in comparison to the other arrangements of the feeding patch (1650, 1670). The improved total efficiency may be achieved because the feeding patch may be excited both excitation patches simultaneously. Thus, for the total efficiency an arrangement of the feeding patch may be between both excitation patches.

More details and aspects are mentioned in connection with the examples described above and/or below. The example shown in FIG. 16 may comprise one or more optional additional features corresponding to one or more aspects mentioned in connection with the proposed concept or one or more examples described above (e.g., FIG. 1-15) and/or below (e.g., FIG. 17-30).

Figure 17:
FIG. 17 shows a schematic view of a cross section of another example of a patch antenna.

FIG. 17 shows a schematic view of a cross section of another example of a patch antenna. The patch antenna 1700 may comprise a parasitic patch layer 1711, a radiation and excitation layer 1714, a first feeding layer 1780 (also referred as Layer 3; L3), which feds a second port, a ground layer 1730 and a feeding layer 1740, which feds a first port. The layers L1, L2, L3, L4 and L5 may be made of a conducting material, e.g., copper.

Further the patch antenna 1700 may comprise a plurality of dielectric layers 1790, 1791, 1792, 1793, e.g., made of Rogers RT 5880 with $\varepsilon_r$=2.2 (relative permittivity) and Dielectric loss=0.0009. A thickness of a dielectric layer 1790 may be at least 0.224 mm, at least 0.234 mm or at least 0.244 mm and/or at most 0.274 mm, at most 2.64 mm or at most 2.54 mm. A thickness of a dielectric layer 1791 may be at least 0.9 mm, at least 0.95 mm or at least 1 mm and/or at most 1.1 mm, at most 1.05 mm or at most 1.016 mm. A thickness of a dielectric layer 1792 may be at least 0.115 mm, at least 0.12 mm or at least 0.125 mm and/or at most 0.135 mm, at most 0.13 mm or at most 0.127 mm. A thickness of a dielectric layer 1793 may be at least 0.115 mm, at least 0.12 mm or at least 0.125 mm and/or at most 0.135 mm, at most 0.13 mm or at most 0.127 mm. A return loss characteristic may depend on a thickness of the pluralities of dielectric layers, especially on the dielectric layer 1790. For example, a thickness of the dielectric layer 1790 may improve a return loss characteristic of the patch antenna 1700.

The antenna design of the patch antenna 1700 shown in FIG. 17 may comprise a 5-layer printed circuit board (PCB) with 1.6 mm overall thickness. The Rogers RT 5880 laminate may be used in antenna design for all dielectric layers. The stack-up details of an example are given in Tab. 2, where layer L1 (top layer) may comprise a parasitic patch, layer L2 may comprise a feeding patch and two excitation patches and a first feeding network may be implemented in layer L3 and a second feeding network may be implanted in layer L5. The ground layer 1730 may be layer L4.

TABLE 2

| PCB antenna stack-up. | | | | |
|---|---|---|---|---|
| Layer | Name | Material | Dielectric constant | Thickness (mm) |
| L1 (top layer) | Parasitic patch | Conductor | — | 0.017 |
| | Dielectric | Rogers 5880 | 2.2 | 0.254 |
| L2 | Radiation and excitation patch | Conductor | — | 0.017 |
| | Dielectric | Rogers 5880 | 2.2 | 1.016 |
| L3 | First feeding network | Conductor | — | 0.017 |
| | Dielectric | Rogers 5880 | 2.2 | 0.127 |
| L4 | Ground layer | Conductor | — | 0.017 |
| | Dielectric | Rogers 5880 | 2.2 | 0.127 |
| L5 (bottom layer) | Second feeding network | Conductor | — | 0.017 |

More details and aspects are mentioned in connection with the examples described above and/or below. The example shown in FIG. 17 may comprise one or more optional additional features corresponding to one or more aspects mentioned in connection with the proposed concept or one or more examples described above (e.g., FIG. 1-16) and/or below (e.g., FIG. 18-30).

Figure 18:
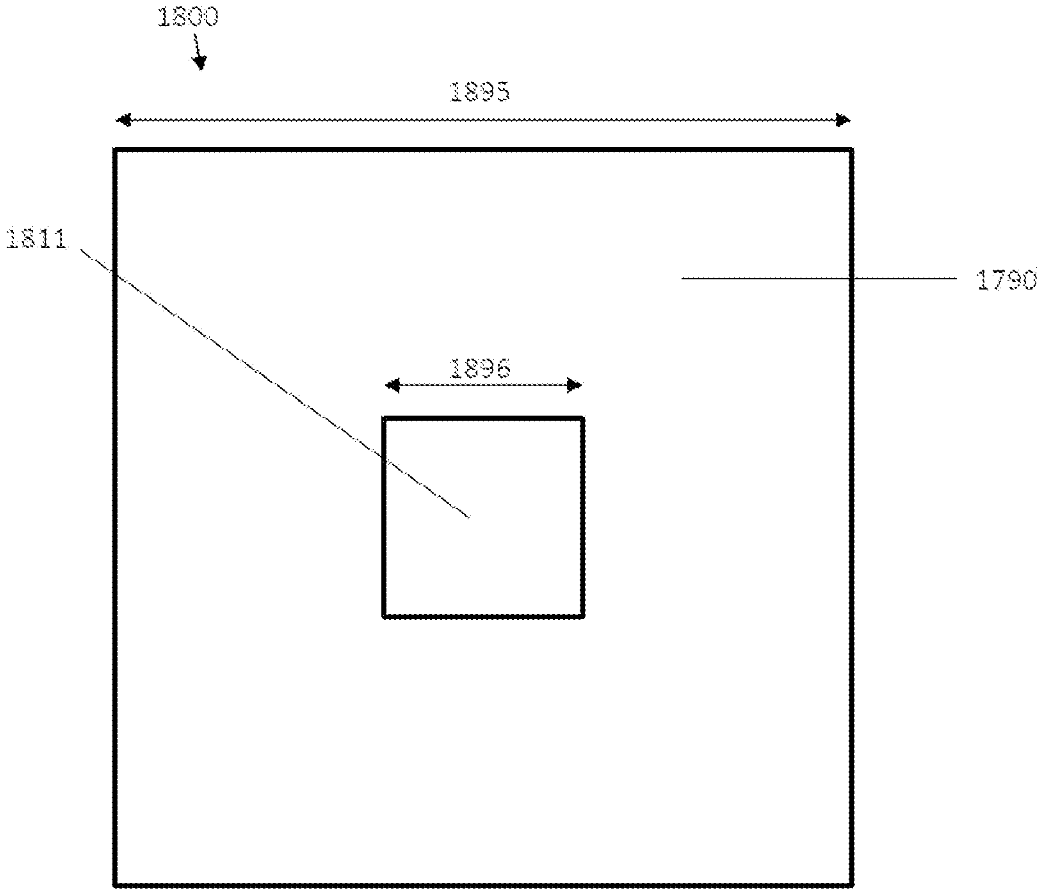
FIG. 18 shows a top view of a parasitic patch layer of a multiband antenna from FIG. 17.

FIG. 18 shows a top view of a parasitic patch layer of an antenna from FIG. 17. The patch antenna 1800 comprises a L1 (top layer) 1890 and a parasitic patch 1811. L1 1890 may have an outer dimension 1895 of at least 8 mm, at least 9 mm or at least 10 mm and/or at most 13 mm, at most 12 mm or at most 11 mm. The parasitic patch 1811 may have an outer dimension 1896 of at least 2.0 mm, at least 2.3 mm or at least 2.6 mm and/or at most 3.3 mm, at most 3.0 mm or at most 2.7 mm. From a top view shown in FIG. 18 a center of the parasitic patch 1811 may be arranged at a center of the L1 1890.

The ground layer (e.g., L4) may be arranged in a first layer of a printed circuit board the excitation layer (e.g., L3) may be arranged in a second layer of the printed circuit board and the parasitic patch may be arranged in a third layer (e.g., L1) of the printed circuit board, wherein the second layer of the printed circuit board may be arranged between the first layer and third layer of the printed circuit board.

More details and aspects are mentioned in connection with the examples described above and/or below. The example shown in FIG. 18 may comprise one or more optional additional features corresponding to one or more aspects mentioned in connection with the proposed concept or one or more examples described above (e.g., FIGS. 1-17) and/or below (e.g., FIGS. **19*a*-30**).

FIG. **19*a* shows a top view section of an excitation layer of a patch antenna from FIG. 17. The excitation layer 1914 comprises a first excitation patch 1920, a second excitation patch 1922, a first feeding patch 1924, a second feeding patch 1944, a third feeding patch 1964 and a fourth feeding patch 1984. L2 may have an outer dimension of at least 8 mm, at least 9 mm or at least 10 mm and/or at most 13 mm, at most 12 mm or at most 11 mm. The first excitation patch 1920 may have an outer dimension 1996 of at least 1.7 mm, at least 2.0 mm or at least 2.3 mm and/or at most 3.3 mm, at most 3.0 mm or at most 2.6 mm. The second excitation patch 1922 may have an outer dimension 1997 of at least 0.7 mm, at least 0.9 mm or at least 1.05 mm and/or at most 1.5 mm, at most 1.3 mm or at most 1.1 mm. From a top view shown in FIG. 19*a* a center of the first excitation patch 1920 may be arranged at a center of L2. A center of the second excitation 1922 may be arranged at a center of the first excitation patch 1920. A feeding gap 1998 may be of at least 0.02 mm, at least 0.03 mm or at least 0.04 mm and/or at most 0.07 mm, at most 0.06 mm or at most 0.05 mm. A separation gap 1999** may be of at least 0.02 mm, at least 0.03 mm or at least 0.04 mm and/or at most 0.07 mm, at most 0.06 mm or at most 0.05 mm.

The feeding patches 1924, 1964, 1944, 1984 are arranged between the first excitation patch 1920 and the second excitation patch 1922 such that the feeding patches 1924, 1964, 1944, 1984 may have coupling to both the excitation patches 1920, 1922. The first feeding patch 1924 may be excited by equal amplitude and a 180° phase shift signal compared to the second feeding patch 1944 ($\Delta\Phi$=180°). In the similar way the third feeding patch 1964 may have an equal amplitude and 180° phase shift signal compared to fourth feeding patch 1984 ($\Delta\Phi$=180°).

The multiband patch antenna may further comprise a third feeding patch 1964 and a fourth feeding patch 1984, as shown in FIG. **19*a*. The third feeding patch 1964 and the fourth feeding patch 1984 are arranged on opposite edges of the second excitation patch. Further, the first 1924 and second feeding patches 1944 may be fed a different radio signal polarity than the third 1964 and fourth feeding patches 1984**. The patch antenna may be a dual-polarized antenna by adding the identical feed orthogonally to the third and fourth patch. Therefore, a multiple-input and multiple-output (MIMO) performance may be improved by the third and the fourth excitation patch, e.g., a return-loss-characteristic may improve and/or an impedance bandwidth may improve.

The patch antenna may further comprise a second feeding network for the third feeding patch 1964 and the fourth feeding 1984 patch, wherein the second feeding network may be a balanced feeding network. The balanced feeding network may have a phase difference of 180°. Due to a symmetric of the antenna a beam squint may be reduced.

More details and aspects are mentioned in connection with the examples described above and/or below. The example shown in FIG. **19*a* may comprise one or more optional additional features corresponding to one or more aspects mentioned in connection with the proposed concept or one or more examples described above (e.g., FIG. 1-18) and/or below (e.g., FIG. 19*b*-30**).

FIG. **19*b* shows a top view section of different examples of an excitation layer of a patch antenna from FIG. 17. The eight different examples of forming an excitation layer 1914 shown in FIG. 19*b* may be provide the same radiation characteristic as the excitation layer shown in FIG. 19***a*. Thus, a shape of an excitation patch and/or feeding patch may be flexible chosen, e.g., depending on a manufacturing process step.

More details and aspects are mentioned in connection with the examples described above and/or below. The example shown in FIG. 19*b* may comprise one or more optional additional features corresponding to one or more aspects mentioned in connection with the proposed concept or one or more examples described above (e.g., FIG. 1-19*a*) and/or below (e.g., FIG. 20-30).

Figure 19A:
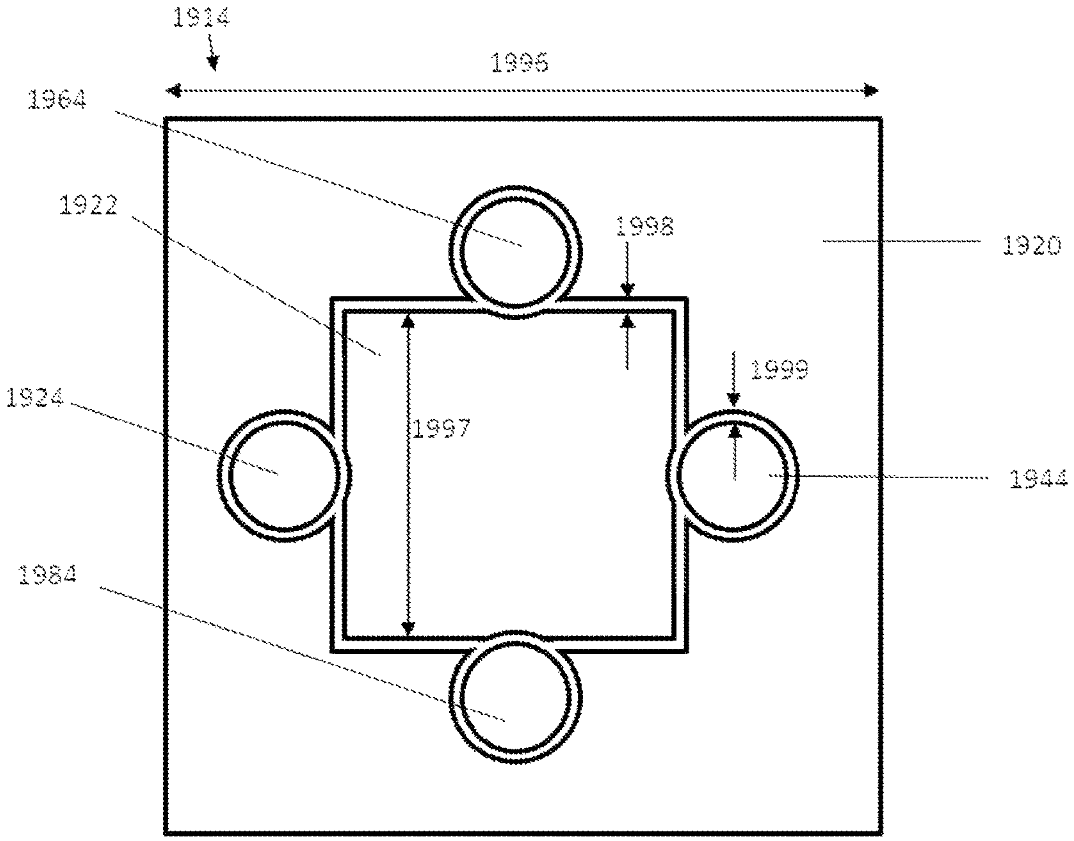
FIG. 19A shows a top view section of an excitation layer of a patch antenna from FIG. 17.
Figure 19B:
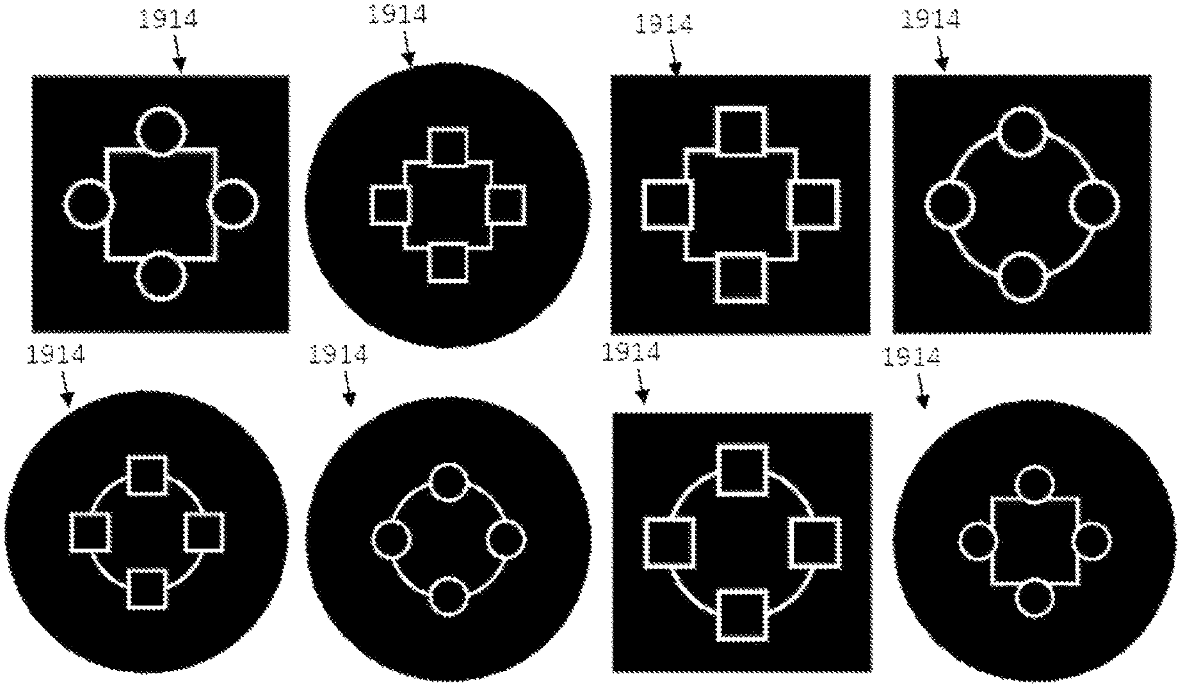
FIG. 19B shows a top view section of different examples of an excitation layer of a patch antenna from FIG. 17.
Figure 20:
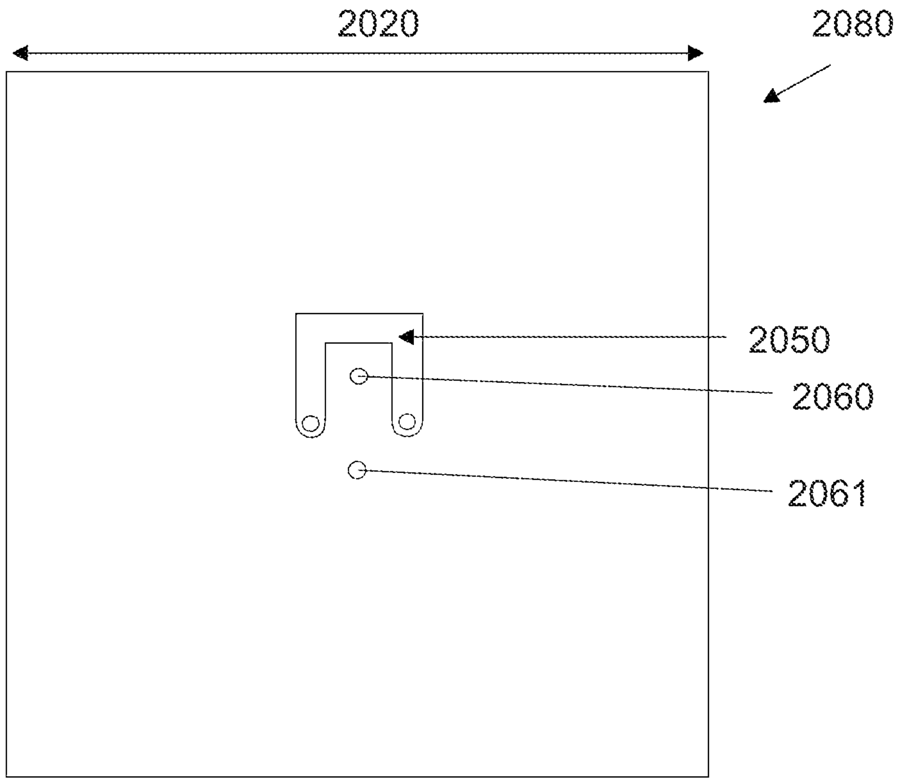
FIG. 20 shows a top view of a first feeding layer of an antenna from FIG. 17.

FIG. 20 shows a top view of a first feeding layer L3 of a patch antenna from FIG. 17. The first feeding layer 2080 may comprise a feeding structure 2050 for a port1. The port1 may be used to feed a first and a second feeding patch (see FIG. 19*a*). The feeding structure may be a balanced feed network. The balanced feed network may have a phase difference of 180°. Due to a symmetric of the antenna a beam squint may be reduced. Further, the first feeding layer 2080 may comprises a part of a two vias 2060, 2061 for feeding a third and a fourth excitation patch each. The first feeding layer 2080 may have an outer dimension 2020 of at least 8 mm, at least 9 mm or at least 10 mm and/or at most 13 mm, at most 12 mm or at most 11 mm.

More details and aspects are mentioned in connection with the examples described above and/or below. The example shown in FIG. 20 may comprise one or more optional additional features corresponding to one or more aspects mentioned in connection with the proposed concept or one or more examples described above (e.g., FIG. 1-19) and/or below (e.g., FIG. 21-30).

Figure 21:
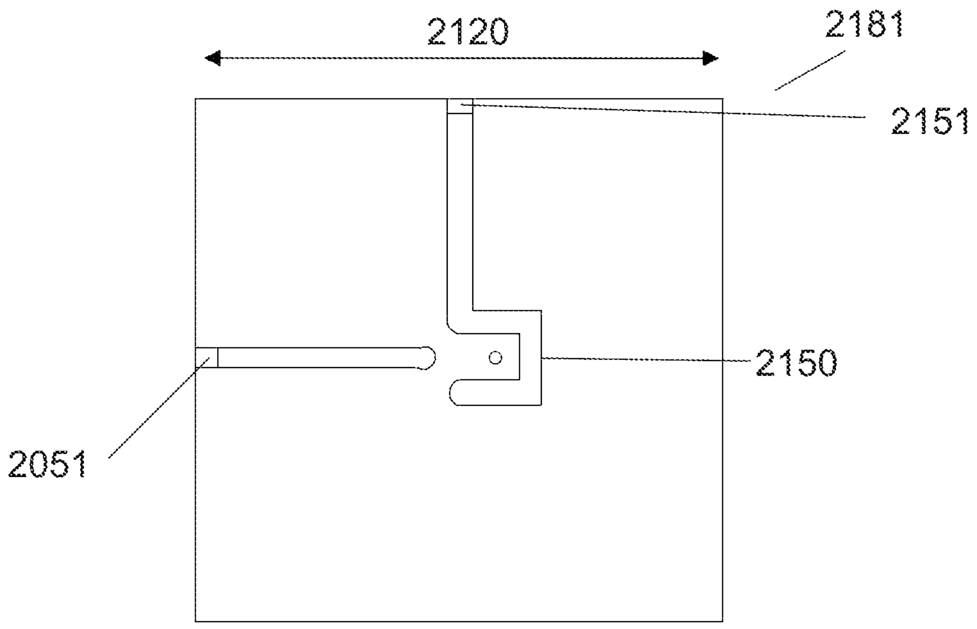
FIG. 21 shows a top view of a second feeding layer of an antenna from FIG. 17.

FIG. 21 shows a top view of a second feeding layer L5 of a patch antenna from FIG. 17. The second feeding layer 2181 may comprise a feeding structure 2150 for a port2. The port2 may be used to feed a third and a fourth feeding patch (see FIG. 19*a*). The feeding structure 2150 may be a balanced feed network. The balanced feed network 2150 may have a phase difference of 180°. Due to a symmetric of the antenna a beam squint may be reduced. Further, the second feeding layer 2181 may comprise a second feeding point 2151 for the second feeding network 2150. Further, the second feeding layer 2181 may comprise a first feeding point 2051 for a first feeding network (see FIG. 20). Therefore, a manufacturing process of a patch antenna may be improved and/or eased by arranging a feeding points for each of both feeding layers in only one feeding layer, e.g., the second feeding layer 2181. The second feeding layer 2181 may have an outer dimension 2120 of at least 8 mm, at least 9 mm or at least 10 mm and/or at most 13 mm, at most 12 mm or at most 11 mm.

More details and aspects are mentioned in connection with the examples described above and/or below. The example shown in FIG. 21 may comprise one or more optional additional features corresponding to one or more aspects mentioned in connection with the proposed concept or one or more examples described above (e.g., FIG. 1-20) and/or below (e.g., FIG. 22-30).

Figure 22:
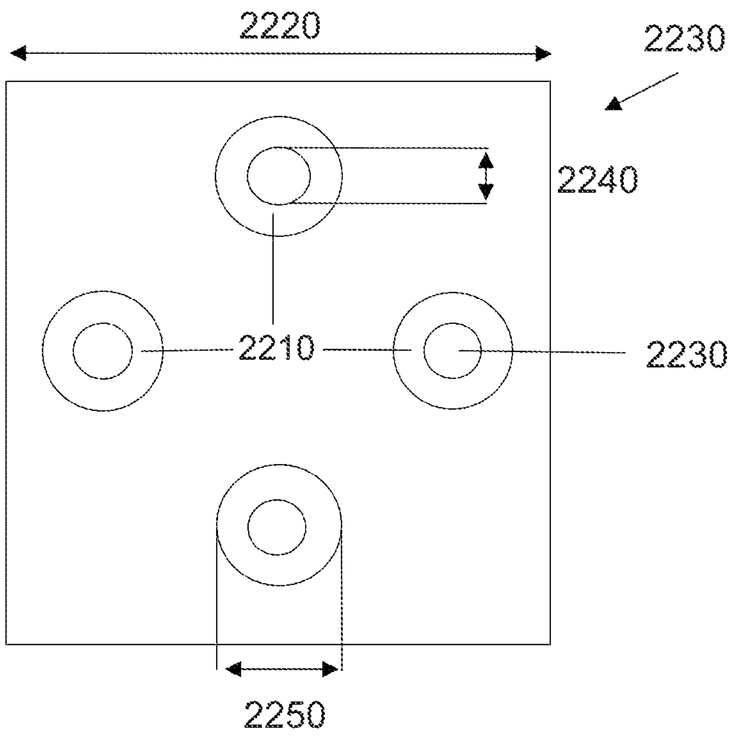
FIG. 22 shows a top view of a ground layer from of an antenna from FIG. 17.

FIG. 22 shows a top view of a ground layer L4 of a patch antenna from FIG. 17. The ground layer 2230 comprises four anti-pads 2210. The anti-pads 2210 may have an outer diameter 2250 of at least 0.4 mm, at least 0.45 mm or at least 0.5 mm and/or at most 0.6 mm, at most 0.55 mm or at most 0.51 mm. The anti-pads 2210 may be formed by etching a small circular portion of a ground away around a feed-probe 2230 at the layer L4, which act as an anti-pad via in layer L4. The anti-pads 2210 may have an inner diameter 2240 of at least 0.185 mm, at least 0.205 mm or at least 0.225 mm and/or at most 0.275 mm, at most 0.255 mm or at most 0.235 mm. The ground plane 2230 may have an outer dimension 2120 of at least 8 mm, at least 9 mm or at least 10 mm and/or at most 13 mm, at most 12 mm or at most 11 mm. L4 2230 may have an outer dimension 2220 of at least 8 mm, at least 9 mm or at least 10 mm and/or at most 13 mm, at most 12 mm or at most 11 mm.

More details and aspects are mentioned in connection with the examples described above and/or below. The example shown in FIG. 22 may comprise one or more optional additional features corresponding to one or more aspects mentioned in connection with the proposed concept or one or more examples described above (e.g., FIG. 1-21) and/or below (e.g., FIG. 23-30).

Figure 23:
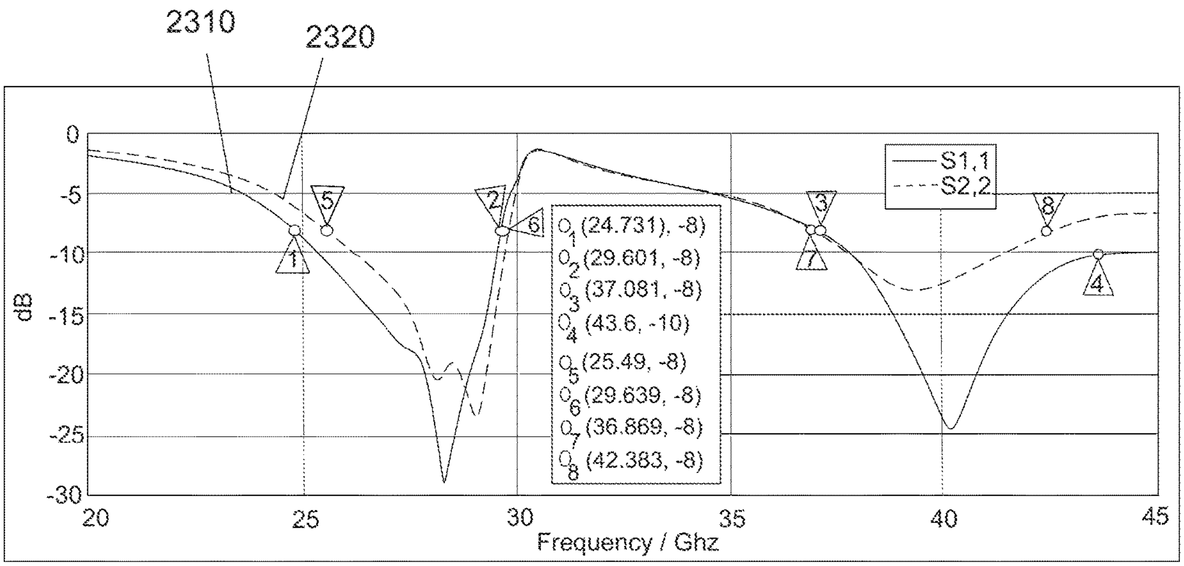
FIG. 23 shows simulation of a magnitude of a S11-parameter and a S22-parameter in db as a function of the frequency for the patch antenna from FIG. 19*a;*

FIG. 23 shows simulation of a magnitude of a S11-parameter and a S22-parameter in db as a function of the frequency for the patch antenna from FIG. 19*a*. FIG. 23 describes the simulated antenna parameters of the proposed antenna design for a 5G dual frequency bands starts from 24.25 GHz to 29.5 GHz and 37 GHz to 40 GHz. A return loss characteristic (impedance matching) for the multiband patch antenna may be improved, as can be seen in FIG. 23. The antenna return loss may be below −8 dB for dual frequency in the range of 24.73 GHz to 29.6 GHz and in the range of 37 GHz to 40 GHz for S1 (port1) and for S22 (port2) frequency range may be 25.5 GHz to 29.64 GHz and 36.9 GHz to 42.38 GHz, respectively. A small deviation can be observed between S11 2310 and S22 2320. This maybe due to a balanced feed network design in different feeding layers. This can be optimized by varying physical dimensions of the first and/or the second feeding network. Thus, an impedance matching for port1 and port2 may be improved by the parameters of the first and second feeding network.

More details and aspects are mentioned in connection with the examples described above and/or below. The example shown in FIG. 23 may comprise one or more optional additional features corresponding to one or more aspects mentioned in connection with the proposed concept or one or more examples described above (e.g., FIG. 1-22) and/or below (e.g., FIG. 24-30).

Figure 24:
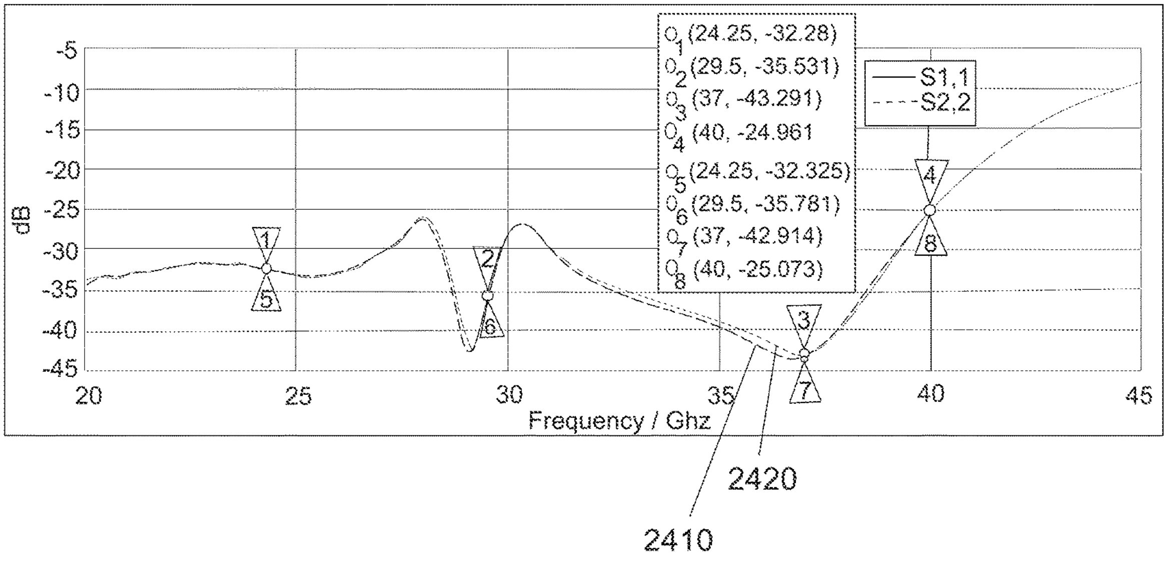
FIG. 24 shows simulation of a magnitude of a S21-parameter and a S12-parameter in db as a function of the frequency for the patch antenna from FIG. 19*a;*

FIG. 24 shows simulation of a magnitude of a S21-parameter and a S12-parameter in db as a function of the frequency for the patch antenna from FIG. 19*a*. The port-to-port isolation from port1 to port2 S12 2410 and vice versa S21 2420 between the orthogonally polarized ports of the antenna is shown in FIG. 24. Both parameters S12 and S21 are below −25 dB in the frequency range from 20 GHz-40 GHz, which ensure a MIMO performance between the two polarizations. Thus, a MIMO performance may be improved by the proposed multiband antenna.

More details and aspects are mentioned in connection with the examples described above and/or below. The example shown in FIG. 24 may comprise one or more optional additional features corresponding to one or more aspects mentioned in connection with the proposed concept or one or more examples described above (e.g., FIG. 1-23) and/or below (e.g., FIG. 25-30).

Figure 25:
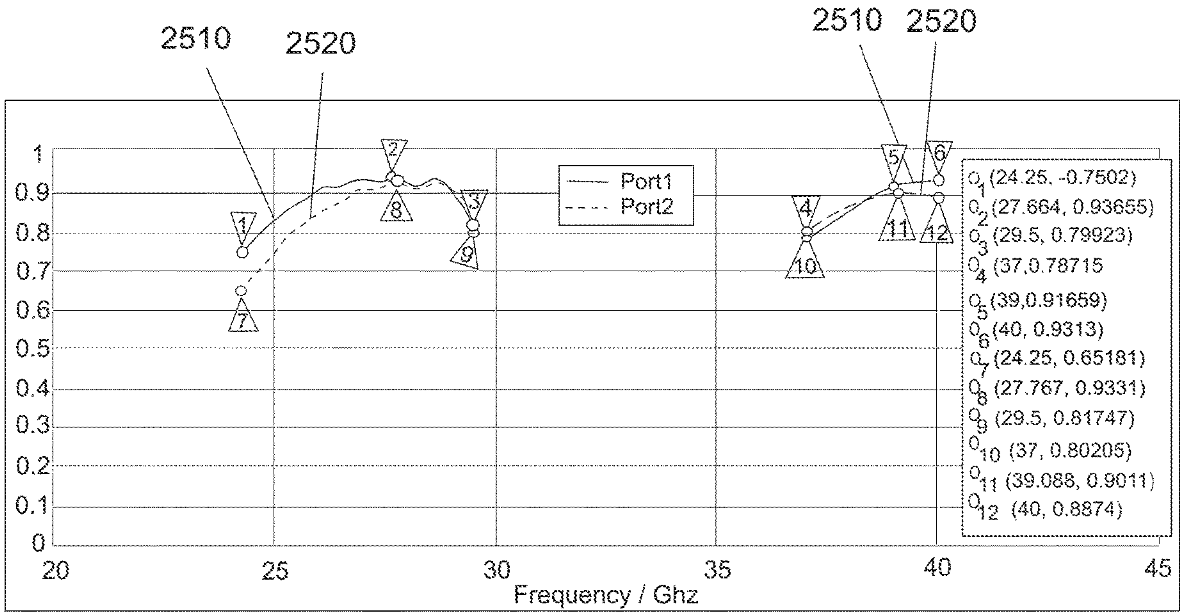
FIG. 25 shows simulations of a total efficiency as a function of the frequency for a S11-parameter and a S22-parameter for the patch antenna from FIG. 19*a;*

FIG. 25 shows simulations of a total efficiency as a function of the frequency for a S11-parameter and a S22-parameter for the patch antenna from FIG. 19*a*. FIG. 25 shows about 90% efficiency at 27.5 GHz and 39 GHz for port1 and port2. Thus, an efficiency of a multiband patch may be improved by a proposed design of the excitation layer.

More details and aspects are mentioned in connection with the examples described above and/or below. The example shown in FIG. 25 may comprise one or more optional additional features corresponding to one or more aspects mentioned in connection with the proposed concept or one or more examples described above (e.g., FIG. 1-24) and/or below (e.g., FIG. 26-30).

Figure 26A:
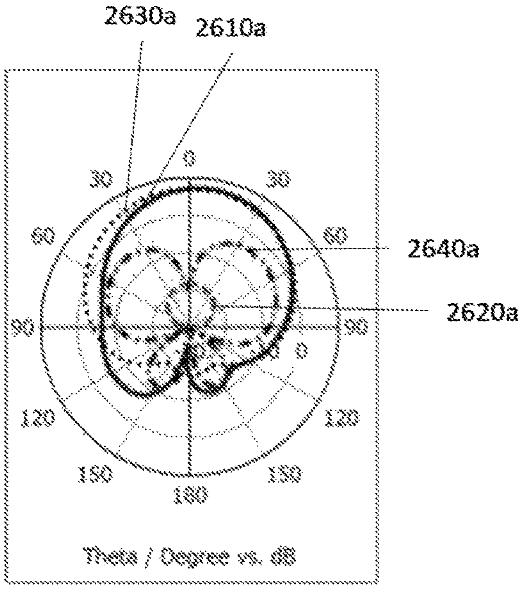
FIGS. 26A and 26B show a radiation pattern for 28 GHz of the patch antenna from FIG. 19*a* for co-polarization and cross-polarization for port1 (FIG. 26*a*)) and port2 (FIG. 26*b*))
Figure 26B:
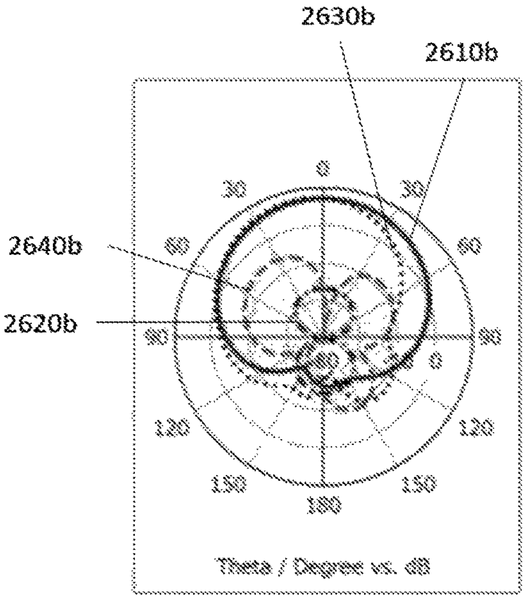

FIG. 26 shows a radiation pattern for 28 GHz of the patch antenna from FIG. 19*a* for co-polarization and cross-polarization for port1 (FIG. 26*a*)) and port2 (FIG. 26*b*). The farfield realized gain theta for the E-plane (Φ=0°) and for the H-plane (Φ=90°) is shown for port1 in FIG. 26*a*) and for port2 in FIG. 26*b*). The cross-polarization of the patch antenna is below −15 dB at Φ=0° and Φ=90° for port1 and port2. The graph 2610*a* is co-polarization for Φ=0°, the graph 2620*a* is cross-polarization for Φ=0°, the graph 2630*a* is co-polarization for Φ=90°, the graph 2640*a* is cross-polarization for Φ=90°. The graph 2610*b* is co-polarization for Φ=0°, the graph 2630*b* is cross-polarization for Φ=0°, the graph 26120*b* is co-polarization for Φ=90°, the graph 2640*b* is cross-polarization for Φ=90°.

The main lobe magnitude in FIG. 26*a*) for co-polarization for Φ=0° may be 7.27 dB and for Φ=90° may be 7 dB and the main lobe direction may be 10° and 1°, respectively. The angular width (at 3 dB) may be 67.1° and 87.9° and the side lobe level may be −13 dB and −23.9 dB, respectively. Thus, a radiation characteristic may be improved in comparison to an antenna with one or two feeding patches.

The main lobe magnitude in FIG. 26*b*) for co-polarization for Φ=0° may be 7.08 dB and for Φ=90° may be 7.4 dB and the main lobe direction may be 0° and 11°, respectively. The angular width (at 3 dB) may be 88° and 68.7° and the side lobe level may be −23.6 dB and −15.5 dB, respectively. Thus, a radiation characteristic may be improved in comparison to an antenna with one or two feeding patches. Therefore, by arranging four feeding patches in an excitation layer and fed the four patches with two different balanced feeding networks may improve a radiation characteristic of a patch antenna.

A beam tilt of ~10° can be observed for co-polarization for Φ=0° for port1 (see graph 2610*a*) and for Φ=90° for port2 (see graph 2630*b*). The small beam tilt may be caused by a delay line used for a first feeding network. Thus, by adjusting a parameter of the first feeding network a radiation characteristic of the patch antenna may be improved.

More details and aspects are mentioned in connection with the examples described above and/or below. The example shown in FIG. 26 may comprise one or more optional additional features corresponding to one or more aspects mentioned in connection with the proposed concept or one or more examples described above (e.g., FIG. 1-25) and/or below (e.g., FIG. 27-30).

Figure 27A:
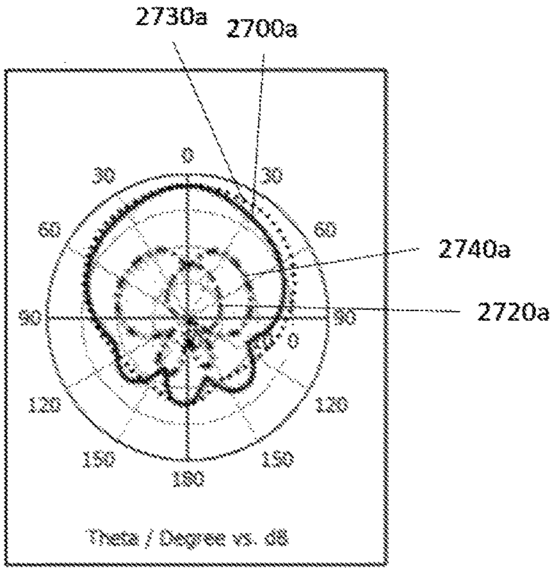
FIGS. 27A and 27B show a radiation pattern for 39 GHz of the patch antenna from FIG. 19*a* for co-polarization and cross-polarization for port1 (FIG. 27*a*)) and port2 (FIG. 27*b*))
Figure 27B:
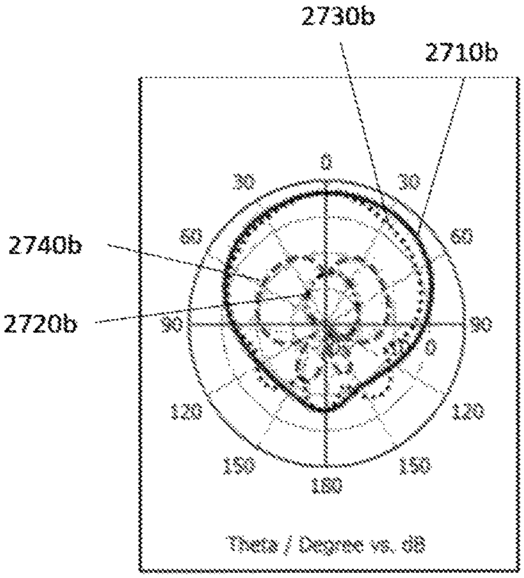

FIG. 27 shows a radiation pattern for 39 GHz of the patch antenna from FIG. 19*a* for co-polarization and cross-polarization for port1 (FIG. 26*a*)) and port2 (FIG. 26*b*). The farfield realized gain theta for the E-plane (Φ=0°) and for the H-plane (Φ=0°) is shown for port1 in FIG. 27*a*) and for port2 in FIG. 27*b*). The cross-polarization of the patch antenna is below −15 dB at Φ=0° and Φ=90° for port1 and port2. The graph 2710*a* is co-polarization for Φ=0°, the graph 2720*a* is cross-polarization for Φ=0°, the graph 2730*a* is co-polarization for Φ=90°, the graph 2740*a* is cross-polarization for Φ=90°. The graph 2710*b* is co-polarization for Φ=0°, the graph 2730*b* is cross-polarization for Φ=0°, the graph 27120*b* is co-polarization for Φ=90°, the graph 2740*b* is cross-polarization for Φ=90°.

The main lobe magnitude in FIG. 27*a*) for co-polarization for Φ=0° may be 6.66 dB and for Φ=90° may be 6.67 dB and the main lobe direction may be 1° and 3°, respectively. The angular width (at 3 dB) may be 65.1° and 115.7° and the side lobe level may be −11.6 dB and −12.6 dB, respectively. Thus, a radiation characteristic may be improved in comparison to an antenna with one or two feeding patches.

The main lobe magnitude in FIG. 27*a*) for co-polarization for Φ=0° may be 6.67 dB and for Φ=90° may be 6.66 dB and the main lobe direction may be 3° and °, respectively. The angular width (at 3 dB) may be 115.7° and 65.1° and the side lobe level may be −12.6 dB and −11.6 dB, respectively. Thus, a radiation characteristic may be improved in comparison to an antenna with one or two feeding patches.

More details and aspects are mentioned in connection with the examples described above and/or below. The example shown in FIG. 27 may comprise one or more optional additional features corresponding to one or more aspects mentioned in connection with the proposed concept or one or more examples described above (e.g., FIG. 1-26) and/or below (e.g., FIG. 28-30).

Figure 28A:
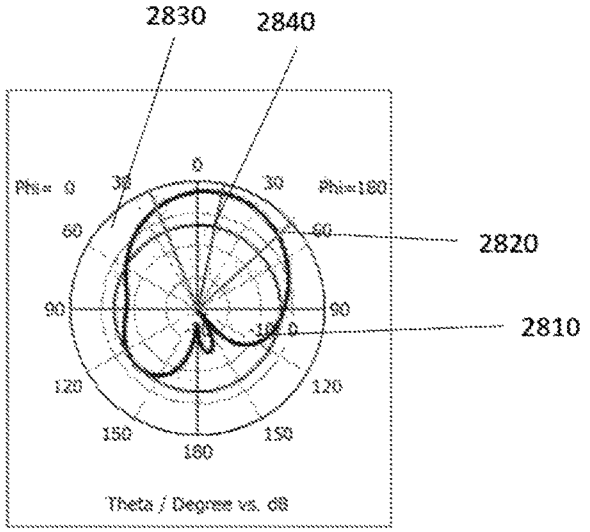
FIGS. 28A and 28B show a 2-D radiation pattern for 28 GHz of the patch antenna from FIG. 19*a;*
Figure 28B:
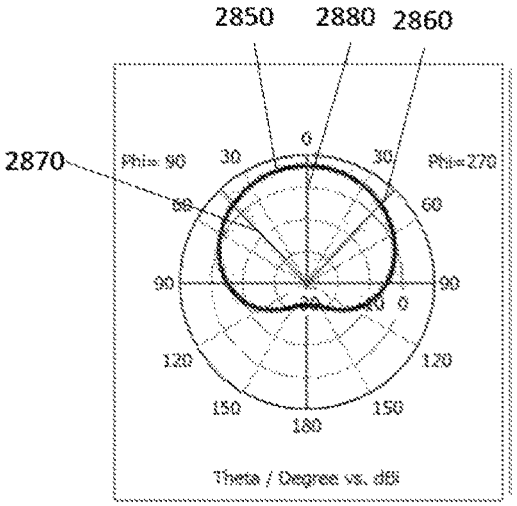

FIG. 28 shows a 2-D radiation pattern for 28 GHz of the patch antenna from FIG. 19*a*. FIG. 28 shows the radiation pattern for a wideband balance first and second feeding network. It can be seen that there may be no beam squint for 28 GHz at both Φ=0° and Φ=90°. The farfield realized gain absolute for the E-plane (Φ=0°) is shown in FIG. 28*a*) with graph 2810 and for the H-plane (Φ=90°) in FIG. 28*b*) with graph 2850. The main lobe magnitude may be 6.27 dB and 6.27 dB and the main lobe direction (indicated by 2840 and 2880) 0° and 0°, respectively. The angular width (at 3 dB) (indicated by 2820/2830 and 2860/2870) may be 76.6° and 76.6°, respectively. Thus, the proposed antenna may be designed in a desired to obtain a radiation pattern. By utilizing four feeding patches and two feeding networks a MIMO operation of a patch antenna may be achieved.

More details and aspects are mentioned in connection with the examples described above and/or below. The example shown in FIG. 28 may comprise one or more optional additional features corresponding to one or more aspects mentioned in connection with the proposed concept or one or more examples described above (e.g., FIG. 1-27) and/or below (e.g., FIG. 29-30).

Figure 29A:
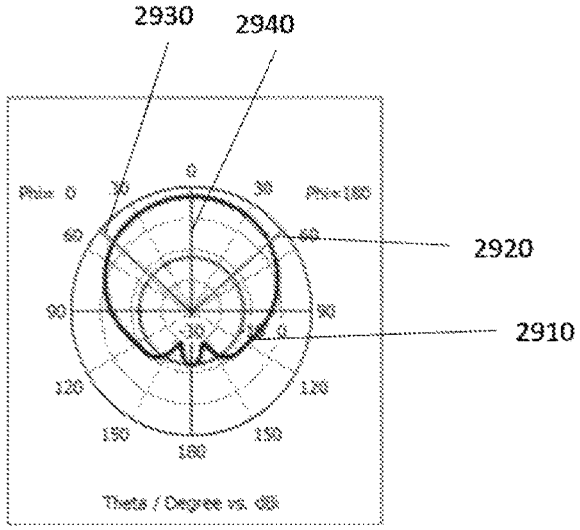
FIGS. 29A and 29B show a 2-D radiation pattern for 39 GHz of the patch antenna from FIG. 19*a*.
Figure 29B:
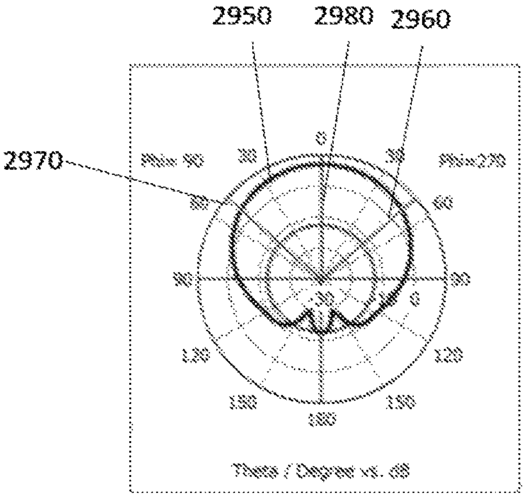

FIG. 29 shows a 2-D radiation pattern for 39 GHz of the patch antenna from FIG. 19*a*. FIG. 29 shows the radiation pattern for a wideband balance first and second feeding network. It can be seen that there may be no beam squint for 39 GHz at both Φ=0° and Φ=90°. The farfield realized gain absolute for the E-plane (Φ=0°) is shown in FIG. 29*a*) with graph 2910 and for the H-plane (Φ=90°) in FIG. 29*b*) with graph 2950. The main lobe magnitude may be 6.9 dB and 6.9 dB and the main lobe direction (indicated by 2940 and 2980) 0° and 0°, respectively. The angular width (at 3 dB) (indicated by 2920/2930 and 2960/2970) may be 99° and 99°, respectively. Thus, the proposed antenna may be designed in a desired to obtain a radiation pattern. By utilizing four feeding patches and two feeding networks a MIMO operation of a patch antenna may be achieved.

More details and aspects are mentioned in connection with the examples described above and/or below. The example shown in FIG. 29 may comprise one or more optional additional features corresponding to one or more aspects mentioned in connection with the proposed concept or one or more examples described above (e.g., FIG. 1-28) and/or below (e.g., FIG. 30).

Figure 30:
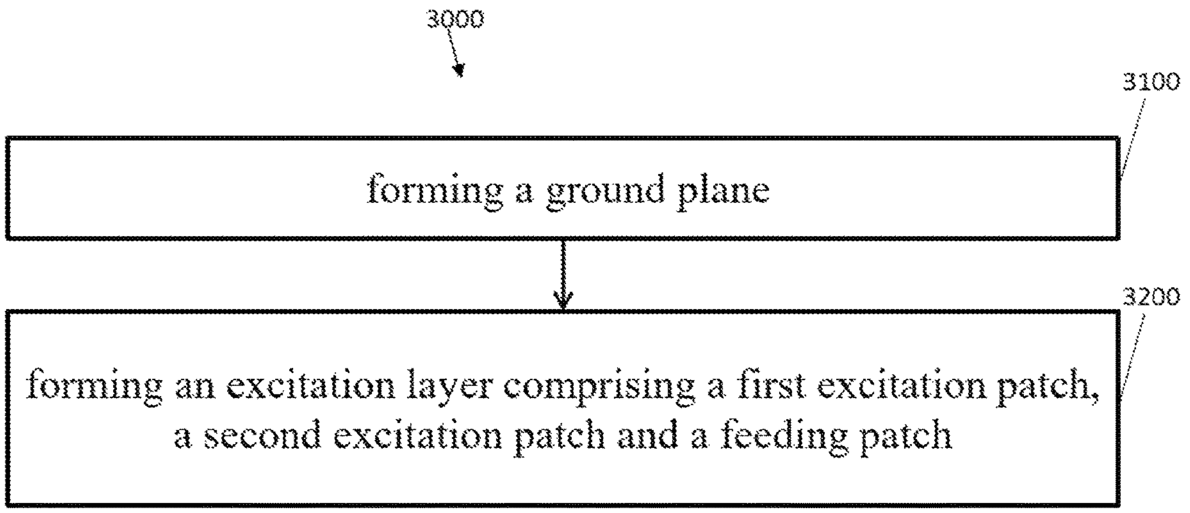
FIG. 30 shows a flow chart of a method for fabricating a patch antenna.

FIG. 30 shows a flow chart of a method for fabricating a patch antenna. The method 3000 comprises forming 3100 a ground layer. Further, the method 3000 comprises forming 3200 an excitation layer comprising a first excitation patch, a second excitation patch and a feeding patch, wherein the feeding patch may be formed to excite the first excitation patch and the second excitation patch simultaneously.

More details and aspects are mentioned in connection with the examples described above and. The example shown in FIG. 30 may comprise one or more optional additional features corresponding to one or more aspects mentioned in connection with the proposed concept or one or more examples described above (e.g., FIG. 1-29).

The proposed patch antenna may be a combination of an inner patch (second excitation patch) and an outer patch (first excitation patch), both the patches are fed using another smaller circular patch (feeding patch), which couples proximately with the inner and outer patches. When only one excitation patch may be used for the proposed patch antenna design, a beam squint issue may be observed. The proposed dual-excitation technique improves a symmetry of the antenna structure, which may reduce a beam squint issue. A balanced feeding network may improve a yield maximum radiation in the broadside. A parasitic patch added in an upper layer of the patch antenna may enhance an impedance bandwidth of the bands. Further, the concept may be extended for the design of dual-polarized antenna by adding the balanced feed orthogonally. The proposed patch antenna may be scalable for any frequency. The proposed patch antenna may help to achieve a compact, wideband, high gain and high efficiency patch antenna for 5G mm-wave RFM. This will be suitable to integrate in advanced 5G mobility systems with better performance.

An electronic device, e.g., a mobile device, may comprise a proposed multiband patch antenna.

Figure 31:
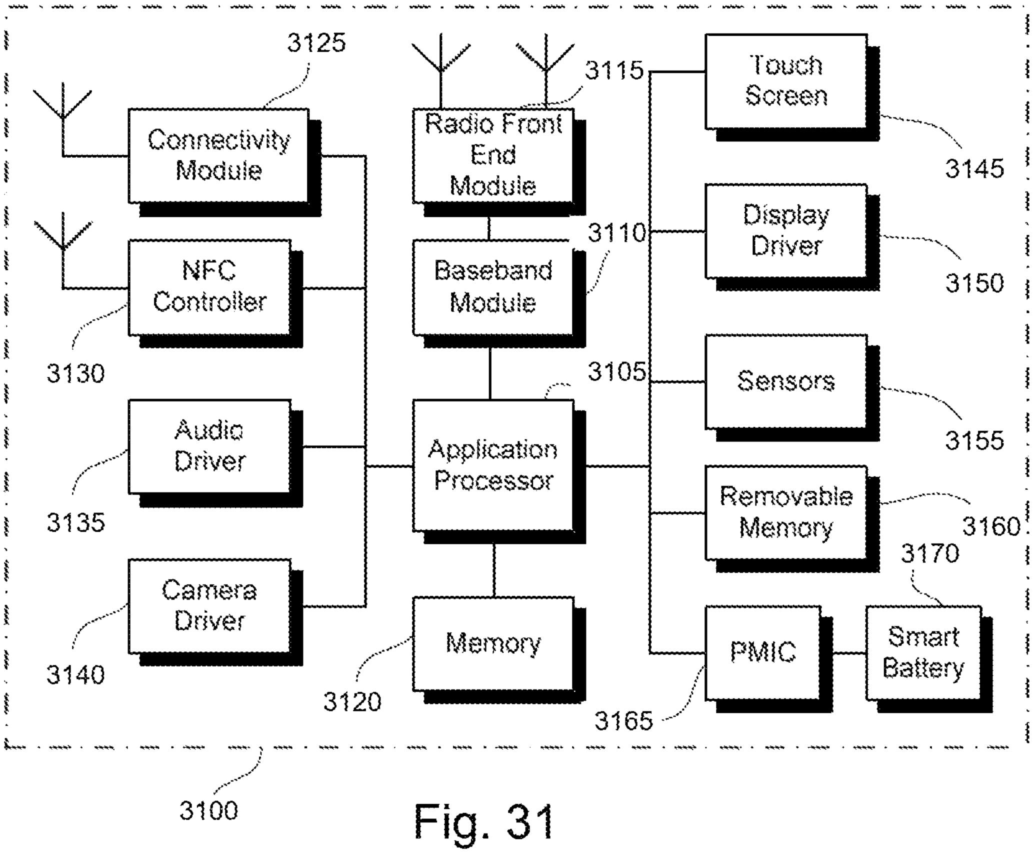
FIG. 31 illustrates a user device in accordance with an aspect.

FIG. 31 illustrates a user device 3100 in accordance with an aspect. The user device 3100 may be a mobile device in some aspects and includes an application processor 3105, baseband processor 3110 (also referred to as a baseband module), radio front end module (RFEM) 3115, memory 3120, connectivity module 3125, near field communication (NFC) controller 3130, audio driver 3135, camera driver 3140, touch screen 3145, display driver 3150, sensors 3155, removable memory 3160, power management integrated circuit (PMIC) 3165 and smart battery 3170.

In some aspects, application processor 3105 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 3110 may be implemented, for example, as a solder-down substrate including one or more integrated circuits, a single packaged integrated circuit soldered to a main circuit board, and/or a multi-chip module containing two or more integrated circuits.

Figure 32:
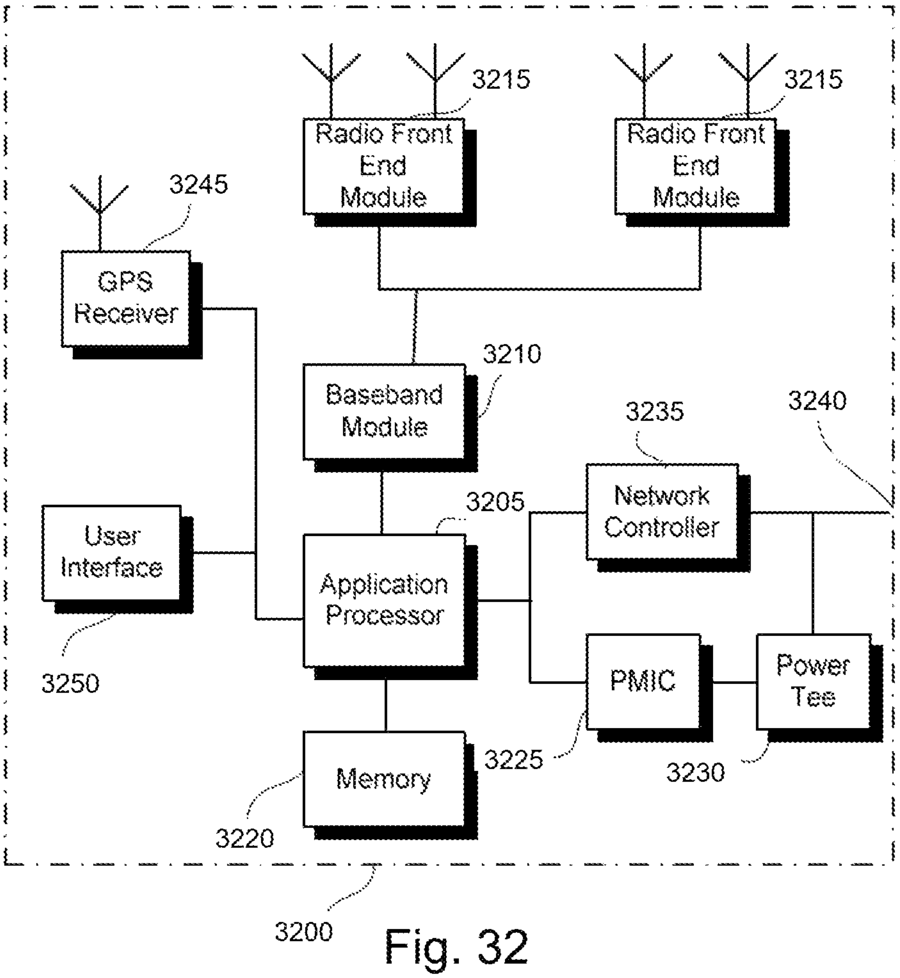
FIG. 32 illustrates a base station or infrastructure equipment radio head in accordance with an aspect.

FIG. 32 illustrates a base station or infrastructure equipment radio head 3200 in accordance with an aspect. The base station radio head 3200 may include one or more of application processor 3205, baseband modules 3210, one or more radio front end modules 3215, memory 3220, power management circuitry 3225, power tee circuitry 3230, network controller 3235, network interface connector 3240, satellite navigation receiver module 3245, and user interface 3250.

In some aspects, application processor 3205 may include one or more CPU cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 3210 may be implemented, for example, as a solder-down substrate including one or more integrated circuits, a single packaged integrated circuit soldered to a main circuit board or a multi-chip module containing two or more integrated circuits.

In some aspects, memory 3220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 3220 may be implemented as one or more of solder down packaged integrated circuits, socketed memory modules and plug-in memory cards.

In some aspects, power management integrated circuitry 3225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 3230 may provide for electrical power drawn from a network cable to provide both power supply and data connectivity to the base station radio head 3200 using a single cable.

In some aspects, network controller 3235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 3245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 3245 may provide data to application processor 3205 which may include one or more of position data or time data. Application processor 3205 may use time data to synchronize operations with other radio base stations.

In some aspects, user interface 3250 may include one or more of physical or virtual buttons, such as a reset button, one or more indicators such as light emitting diodes (LEDs) and a display screen.

Figure 33A:
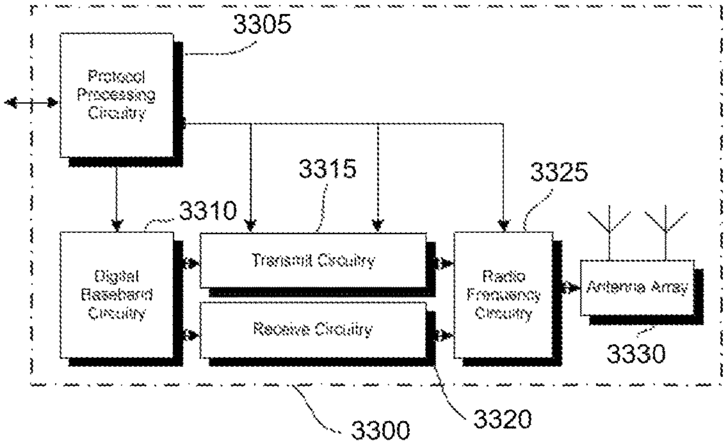
FIG. 33A illustrates an exemplary millimeter wave communication circuitry 3300 according to some aspects.

FIG. 33*a* illustrates an exemplary millimeter wave communication circuitry 3300 according to some aspects. Circuitry 3300 is alternatively grouped according to functions. Components as shown in 3300 are shown here for illustrative purposes and may include other components not shown here in FIG. 33A.

Millimeter wave communication circuitry 3300 may include protocol processing circuitry 3305, which may implement one or more of medium access control (MAC), radio link control (RLC), packet data convergence protocol (PDCP), radio resource control (RRC) and non-access stratum (NAS) functions. Protocol processing circuitry 3305 may include one or more processing cores (not shown) to execute instructions and one or more memory structures (not shown) to store program and data information.

Millimeter wave communication circuitry 3300 may further include digital baseband circuitry 3310, which may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 3300 may further include transmit circuitry 3315, receive circuitry 3320 and/or antenna array circuitry 3330.

Millimeter wave communication circuitry 3300 may further include radio frequency (RF) circuitry 3325. In an aspect of the invention, RF circuitry 3325 may include multiple parallel RF chains for one or more of transmit or receive functions, each connected to one or more antennas of the antenna array 3330.

In an aspect of the disclosure, protocol processing circuitry 3305 may include one or more instances of control circuitry (not shown) to provide control functions for one or more of digital baseband circuitry 3310, transmit circuitry 3315, receive circuitry 3320, and/or radio frequency circuitry 3325.

Figure 33B:
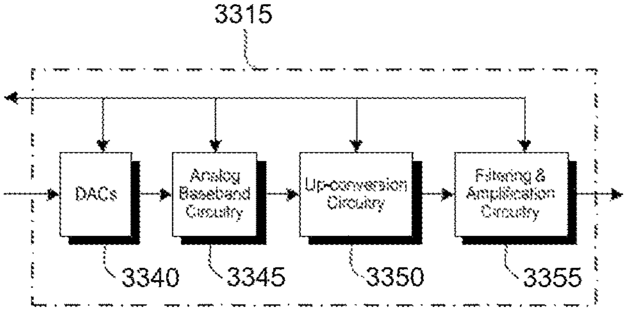
FIGS. 33B and 33C illustrate examples for transmit circuitry in FIG. 33A in some aspects.
Figure 33C:
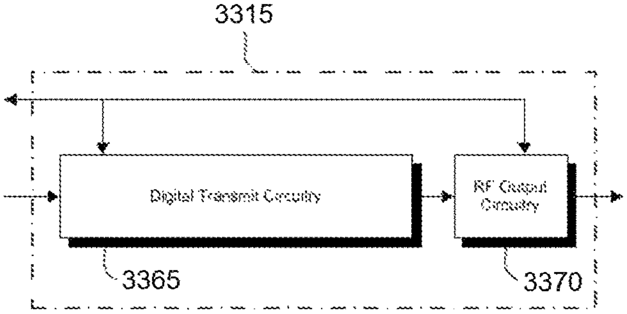

FIGS. 33*b* and 33*c* illustrate examples for transmit circuitry 3315 in FIG. 33*a* in some aspects.

The exemplary transmit circuitry 3315 of FIG. 33*b* may include one or more of digital to analog converters (DACs) 3340, analog baseband circuitry 3345, up-conversion circuitry 3350 and filtering and amplification circuitry 3355. In another aspect, 33*c* illustrates an exemplary transmit circuitry 3315 which includes digital transmit circuitry 3365 and output circuitry 3370.

Figure 33D:
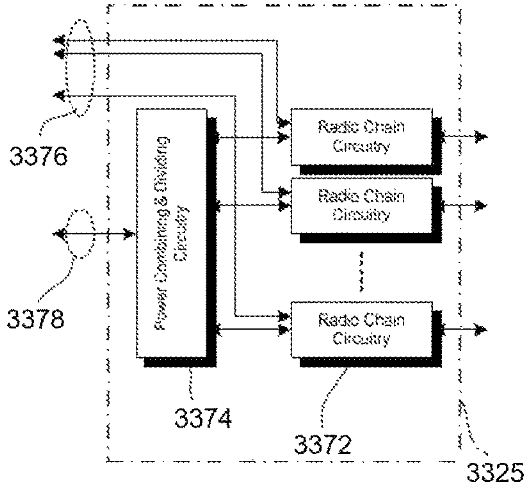
FIG. 33D illustrates an exemplary radio frequency circuitry 3325 in FIG. 33A according to some aspects.

FIG. 33*d* illustrates an exemplary radio frequency circuitry 3325 in FIG. 33*a* according to some aspects.

Radio frequency circuitry 3325 may include one or more instances of radio chain circuitry 3372, which in some aspects may include one or more filters, power amplifiers, low noise amplifiers, programmable phase shifters and power supplies (not shown).

Radio frequency circuitry 3325 may include power combining and dividing circuitry 3374 in some aspects. In some aspects, power combining and dividing circuitry 3374 may operate bidirectionally, such that the same physical circuitry may be configured to operate as a power divider when the device is transmitting, and as a power combiner when the device is receiving. In some aspects, power combining and dividing circuitry 3374 may one or more include wholly or partially separate circuitries to perform power dividing when the device is transmitting and power combining when the device is receiving. In some aspects, power combining and dividing circuitry 3374 may include passive circuitry comprising one or more two-way power divider/combiners arranged in a tree. In some aspects, power combining and dividing circuitry 3374 may include active circuitry comprising amplifier circuits.

In some aspects, radio frequency circuitry 3325 may connect to transmit circuitry 3315 and receive circuitry 3320 in FIG. 33*a* via one or more radio chain interfaces 3376 or a combined radio chain interface 3378.

In some aspects, one or more radio chain interfaces 3376 may provide one or more interfaces to one or more receive or transmit signals, each associated with a single antenna structure which may comprise one or more antennas.

In some aspects, the combined radio chain interface 3378 may provide a single interface to one or more receive or transmit signals, each associated with a group of antenna structures comprising one or more antennas.

Figure 33E:
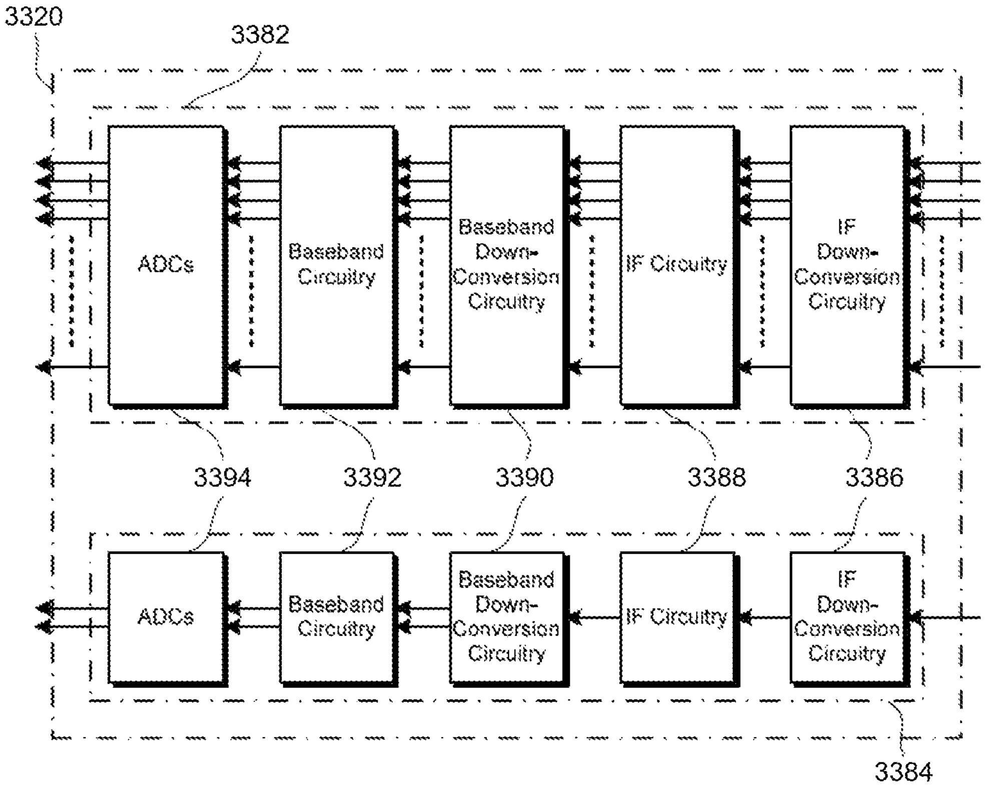
FIG. 33E illustrates exemplary receive circuitry 3320 in FIG. 33A according to some aspects.

FIG. 33*e* illustrates exemplary receive circuitry 3320 in FIG. 33*a* according to some aspects. Receive circuitry 3320 may include one or more of parallel receive circuitry 3382 and/or one or more of combined receive circuitry 3384.

In some aspects, the one or more parallel receive circuitry 3382 and one or more combined receive circuitry 3384 may include one or more Intermediate Frequency (IF) down-conversion circuitry 3386, IF processing circuitry 3388, baseband down-conversion circuitry 3390, baseband processing circuitry 3392 and analog-to-digital converter (ADC) circuitry 3394.

Figure 34:
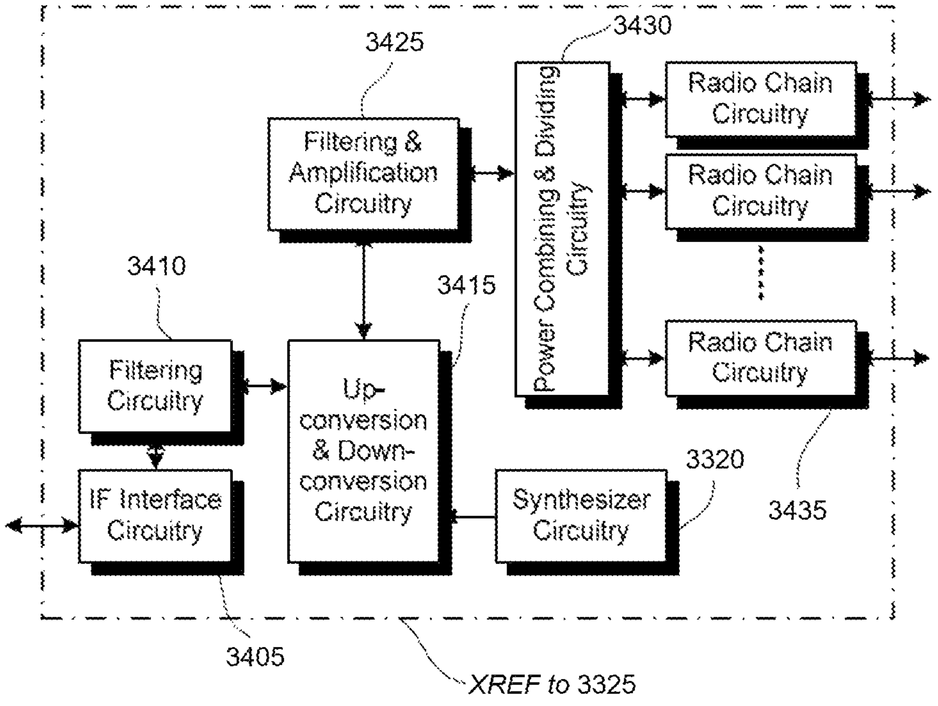
FIG. 34 illustrates RF circuitry XREF to 3325 according to some aspects.

FIG. 34 illustrates RF circuitry XREF to 3325 according to some aspects.

In an aspect, RF circuitry XREF to 3325 may include one or more of each of IF interface circuitry 3405, filtering circuitry 3410, upconversion and downconversion circuitry 3415, synthesizer circuitry 3420, filtering and amplification circuitry 3425, power combining and dividing circuitry 3430 and radio chain circuitry 3435.

B2 Baseband Processor Sub-System

Figure 35:
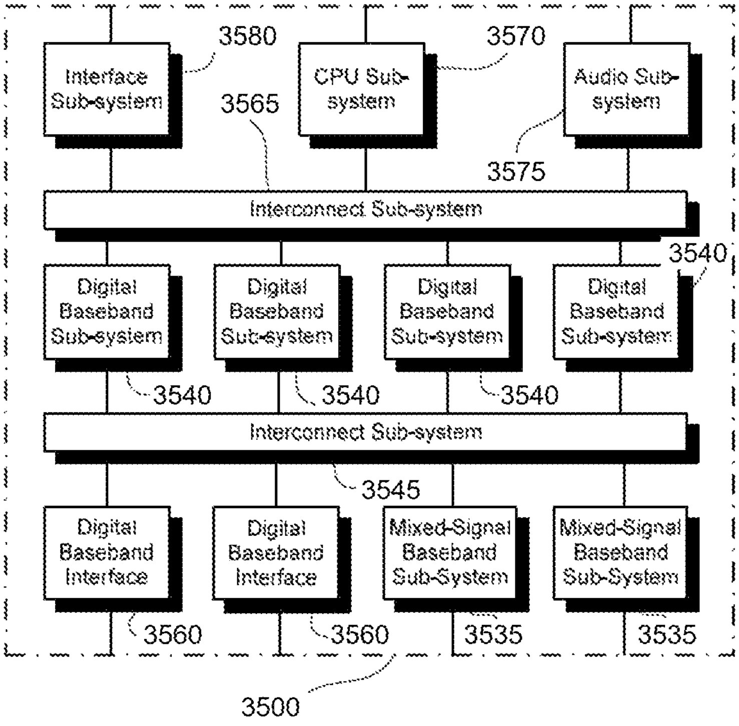
FIG. 35 illustrates a multi-protocol baseband processor in an aspect.

FIG. 35 illustrates a multi-protocol baseband processor 3500 in an aspect.

In an aspect, baseband processor may contain one or more digital baseband systems 3540.

In an aspect, the one or more digital baseband subsystems 3540 may be coupled via interconnect subsystem 3565 to one or more of CPU subsystem 3570, audio subsystem 3575 and interface subsystem 3580.

In an aspect, the one or more digital baseband subsystems 3540 may be coupled via interconnect subsystem 3545 to one or more of each of digital baseband interface 3560 and mixed-signal baseband sub-system 3535.

In an aspect, interconnect subsystem 3565 and 3545 may each include one or more of each of buses point-to-point connections and network-on-chip (NOC) structures.

In an aspect, audio sub-system 3575 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters.

Figure 36:
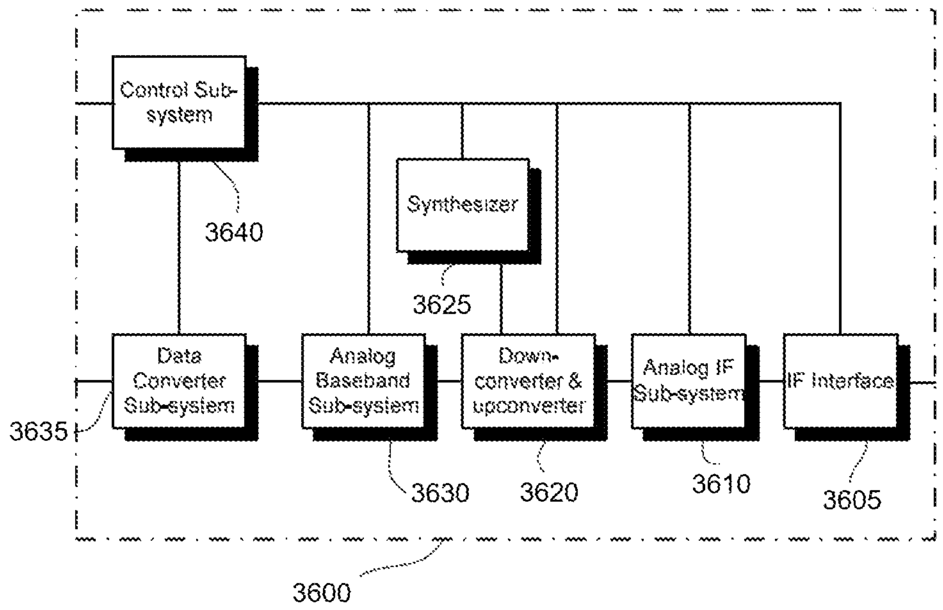
FIG. 36 illustrates an example of a mixed signal baseband subsystem (cross reference to base-band processor subsystem) in an aspect.

FIG. 36 illustrates an example of a mixed signal baseband subsystem 3600 (cross reference to baseband processor subsystem) in an aspect.

In an aspect, mixed signal baseband sub-system 3600 may include one or more of IF interface 3605, analog IF subsystem 3610, downconverter and upconverter subsystem 3620, analog baseband subsystem 3630, data converter subsystem 3635, synthesizer 3625 and control sub-system 3640.

Figure 37A:
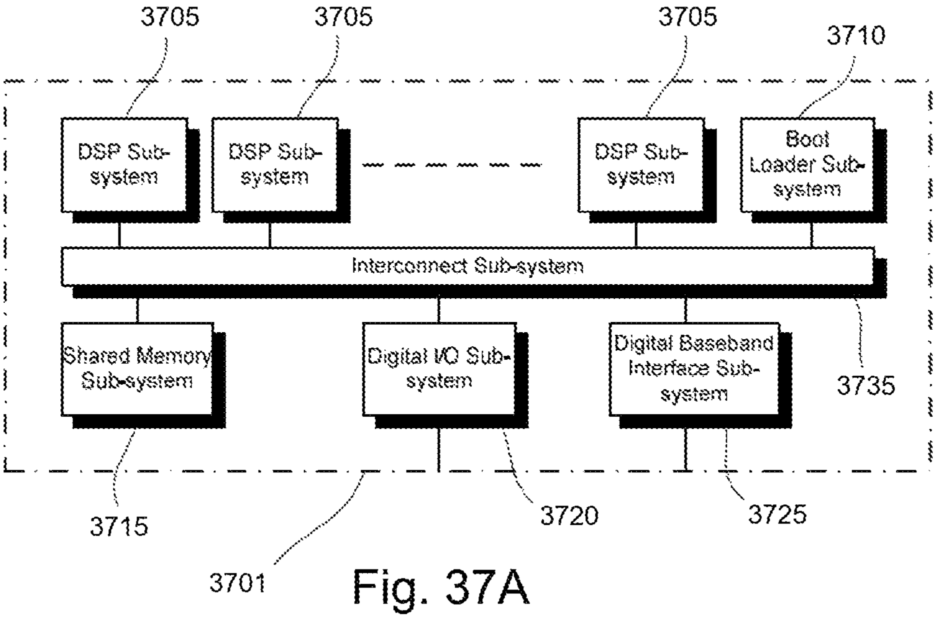
FIGS. 37A and 37B illustrate an aspect of a digital baseband subsystem.
Figure 37B:
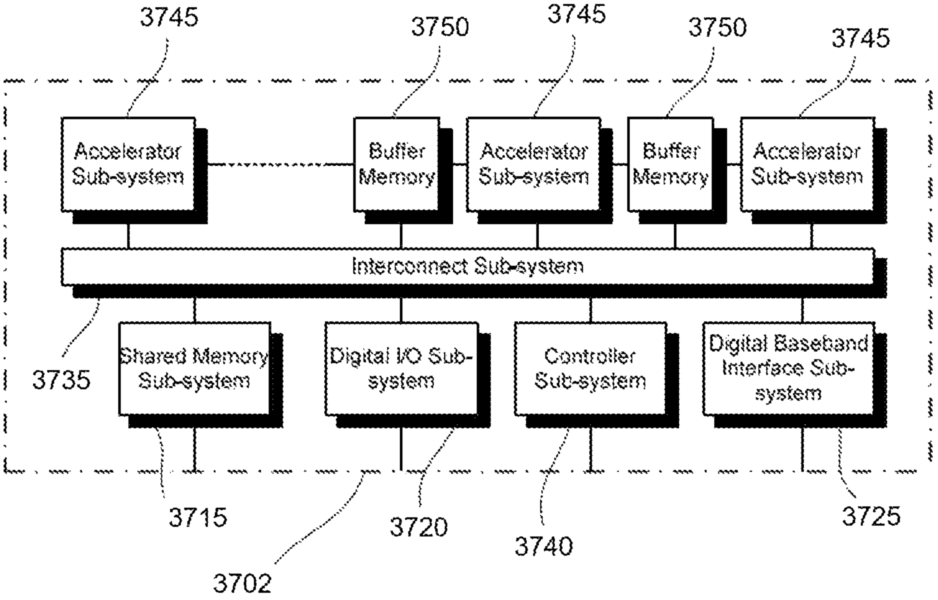

FIG. 37*a* illustrates an aspect 3701 of a digital baseband subsystem (3700 cross reference to digital baseband module). FIG. 37*b* illustrates an alternate aspect 3702 of a baseband processing subsystem (3700 cross reference to digital baseband module). (NOTE—need text to explain that there may be examples of both of these implementations in the same baseband).

In an example aspect of FIG. 37*a*, baseband processing subsystem 3701 may include one or more of each of DSP sub-systems 3705, interconnect sub-system 3735, boot loader sub-system 3710, shared memory sub-system 3715, digital I/O sub-system 3720, digital baseband interface sub-system 3725 and audio sub-system 3730.

In an example aspect of FIG. 37*b*, baseband processing subsystem 3702 may include one or more of each of accelerator subsystem 3745, buffer memory 3750, interconnect sub-system 3735, audio sub-system 3730, shared memory sub-system 3715, digital I/O subsystem 3720, controller sub-system 3740 and digital baseband interface sub-system 3725.

In an aspect, boot loader sub-system 3710 may include digital logic circuitry configured to perform configuration of the program memory and running state associated with each of the one or more DSP sub-systems 3705. Configuration of the program memory of each of the one or more DSP sub-systems 3705 may include loading executable program code from storage external to baseband processing sub-system (3700 cross reference). Configuration of the running state associated with each of the one or more DSP sub-systems 3705 may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, shared memory sub-system 3715 may include one or more of read-only memory (ROM), static random access memory (SRAM), embedded dynamic random access memory (eDRAM) and non-volatile random access memory (NVRAM).

In an aspect, digital I/O subsystem 3720 may include one or more of serial interfaces such as I2C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem 3720 may permit a microprocessor core external to baseband processing subsystem (3700 cross reference) to read and/or write one or more of control and data registers and memory. In an aspect, DMA logic circuitry implemented in digital I/O subsystem 3720 may permit transfer of contiguous blocks of data between memory locations including memory locations internal and external to baseband processing subsystem (3700 cross reference).

In an aspect, digital baseband interface sub-system 3725 may provide for the transfer of digital baseband samples between baseband processing subsystem (3700 cross reference) and mixed signal baseband or radio-frequency circuitry external to baseband processing subsystem (3700 cross reference). In an aspect, digital baseband samples transferred by digital baseband interface sub-system 3725 may include in-phase and quadrature (I/Q) samples.

In an aspect, controller sub-system 3740 may include one or more of each of control and status registers and control state machines. In an aspect, control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems 3745.

Figure 38:
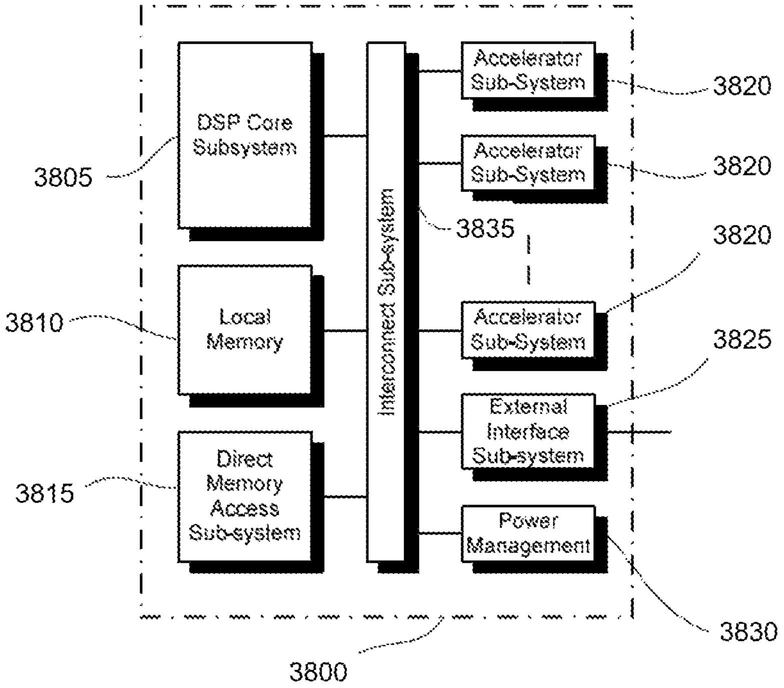
FIG. 38 illustrates a digital signal processor (DSP) subsystem that may be used in an aspect.

FIG. 38 illustrates a digital signal processor (DSP) sub-system 3800 that may be used in an aspect.

In an aspect, DSP sub-system 3800 may include one or more of each of DSP core sub-system 3805, local memory 3810, direct memory access sub-system 3815, accelerator sub-system 3820, external interface sub-system 3825, power management unit 3830 and interconnect sub-system 3835.

In an aspect, local memory 3800 may include one or more of each of read-only memory, static random access memory or embedded dynamic random access memory.

In an aspect, direct memory access sub-system 3815 may provide registers and control state machine circuitry adapted to transfer blocks of data between memory locations including memory locations internal and external to digital signal processor sub-system 3800.

In an aspect, external interface sub-system 3825 may provide for access by a microprocessor system external to DSP sub-system 3800 to one or more of memory, control registers and status registers which may be implemented in DSP sub-system 3800. In an aspect, external interface sub-system 3825 may provide for transfer of data between local memory 3800 and storage external to DSP sub-system 3800 under the control of one or more of DMA sub-system 3815 and DSP core sub-system 3805.

Figure 39A:
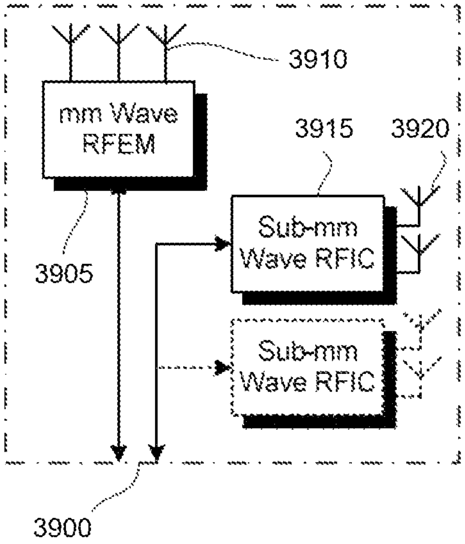
FIGS. 39A and 39B illustrate aspects of a radio front end module.
Figure 39B:
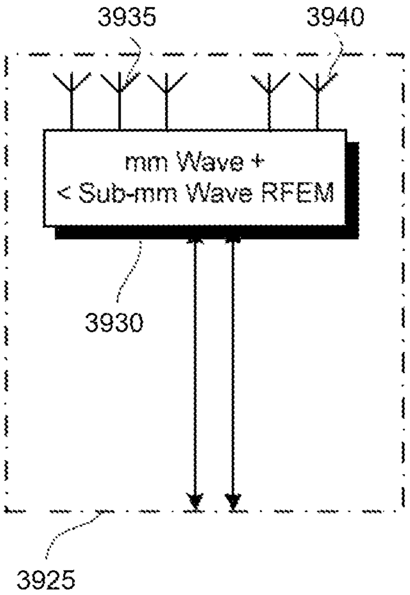

FIGS. 39*a* and 39*b* illustrate aspects of a radio front end module.

FIG. 39A illustrates an aspect of a radio front end module 3900 incorporating a millimeter wave radio front end module (RFEM) 3905 and one or more sub-millimeter wave radio frequency integrated circuits (RFIC) 3915. In this aspect, the one or more sub-millimeter wave RFICs 3915 may be physically separated from a millimeter wave RFEM 3905. RFICs 3915 may include connection to one or more antennas 3920. RFEM 3905 may be connected to multiple antennas 3910.

FIG. 39*b* illustrates an alternate aspect of a radio front end module 3925. In this aspect both millimeter wave and sub-millimeter wave radio functions may be implemented in the same physical radio front end module 3930. RFEM 3930 may incorporate both millimeter wave antennas 3935 and sub-millimeter wave antennas 3940.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

If some aspects have been described in relation to a device or system, these aspects should also be understood as a description of the corresponding method and vice versa. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

Example 1 is a multiband patch antenna comprising a ground layer and an excitation layer, comprising a first excitation patch, a second excitation patch and a feeding patch, wherein the patch is arranged to excite the first excitation patch and the second excitation simultaneously.

Example 2 according to example 1, the feeding patch is arranged between the first excitation patch and the second excitation patch.

Example 3 according to any of example 1-2, wherein the second excitation patch is enclosed by the first excitation patch.

Example 4 according to any of example 1-3, wherein a center of the second excitation patch is arranged at a center of the first excitation patch.

Example 5 according to any of examples 1-4, wherein a distance between the first excitation patch and the second excitation patch is at most 10 μm.

Example 6 according to any of examples 1-5, wherein a distance between the feeding patch and the first excitation patch and/or the second excitation patch is at least 100 μm.

Example 7 according to any of examples 1-6, further comprising a second feeding patch.

Example 8 according to any of examples 1-7, wherein the feeding patch and the second feeding patch are arranged on opposite edges of the second excitation patch and a first phase for feeding the feeding patch has a phase difference to a second phase for feeding the second feeding patch.

Example 9 according to any examples 1-8, further comprising a first feeding network for the feeding patch and the second feeding patch, wherein the first feeding network is a balanced feeding network.

Example 10 according to any examples 1-9, further comprising a third feeding patch and a fourth feeding patch.

Example 11 according to any example 1-10, wherein the third feeding patch and the fourth feeding patch are arranged on opposite edges of the second excitation patch and wherein the first and second feeding patches feed a different radio signal polarity than the third and fourth feeding patches.

Example 12 according to any example 1-11, further comprising a second feeding network for the third feeding patch and the fourth feeding patch, wherein the second feeding network is a balanced feeding network.

Example 13 according to any example 1-12, further comprising a parasitic patch.

Example 14 according to any example 1-13, wherein the ground layer is located in a first layer of a printed circuit board, the excitation plane is located in a second layer of the printed circuit board and the parasitic patch is located in a third layer of the printed circuit board, wherein the second layer of the printed circuit board is located between the first layer and third layer of the printed circuit board.

Example 15 is a method for fabricating a multiband patch antenna according to any one of the preceding examples comprising forming a ground layer and forming an excitation layer comprising a first excitation patch, a second excitation patch and a feeding patch, wherein the feeding patch is formed to excite the first excitation patch and the second excitation patch simultaneously.

Example 16 is an electronic device comprising a multiband patch antenna according to any of examples 1-14.

Examples 17 is the electronic device of example 16, wherein the electronic device is a mobile device.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A multiband patch antenna comprising:

a ground layer; and an excitation layer, comprising a first excitation patch, a second excitation patch, a feeding patch, and a second feeding patch, wherein the feeding patch and the second feeding patch are arranged to excite the first excitation patch and the second excitation patch, wherein the feeding patch and the second feeding patch are arranged between the first excitation patch and the second excitation patch, the feeding patch and the second feeding patch are separated from the first excitation patch and the second excitation patch, wherein the feeding patch and the second feeding patch are arranged on opposite edges of the second excitation patch, and wherein a first phase for feeding the feeding patch has a phase difference to a second phase for feeding the second feeding patch.

2. The multiband patch antenna according to claim 1, wherein a center of the second excitation patch is arranged at a center of the first excitation patch.

3. The multiband patch antenna according to claim 1, wherein the second excitation patch is enclosed by the first excitation patch.

4. The multiband patch antenna according to claim 1, further comprising a first feeding network for the feeding patch and the second feeding patch, wherein the first feeding network is a balanced feeding network.

5. The multiband patch antenna according to claim 4, further comprising a third feeding patch and a fourth feeding patch.

6. The multiband patch antenna according to claim 5, wherein the third feeding patch and the fourth feeding patch are arranged on opposite edges of the second excitation patch; and wherein the feeding patch and the second feeding patch feed a different radio signal polarity than the third and fourth feeding patch.

7. The multiband patch antenna according to claim 5, further comprising a second feeding network for the third feeding patch and the fourth feeding patch, wherein the second feeding network is a balanced feeding network.

8. The multiband patch antenna according to claim 1, further comprising a parasitic patch.

9. The multiband patch antenna according to claim 8, wherein the ground layer is arranged in a first layer of a printed circuit board;

the excitation layer is arranged in a second layer of the printed circuit board; and the parasitic patch is arranged in a third layer of the printed circuit board, wherein the second layer of the printed circuit board is arranged between the first layer and third layer of the printed circuit board.

10. The multiband patch antenna according to claim 1, wherein a distance between the first excitation patch and the second excitation patch is at most 10 μm.

11. The multiband patch antenna according to claim 1, wherein a distance between the feeding patch and the first excitation patch and/or the second excitation patch is at least 100 μm.

12. A method for fabricating a multiband patch antenna according to claim 1 comprising:

forming the ground layer; and forming the excitation layer comprising the first excitation patch, the second excitation patch, the feeding patch, and the second feeding patch, wherein the feeding patch and the second feeding patch are formed to excite the first excitation patch and the second excitation patch, wherein the feeding patch and the second feeding patch are arranged between the first excitation patch and the second excitation patch, the feeding patch and the second feeding patch are separated from the first excitation patch and the second excitation patch, wherein the feeding patch and the second feeding patch are arranged on opposite edges of the second excitation patch, and wherein feeding the feeding patch with a first phase and feeding the second feeding patch with a second, which has a phase difference to the first phase.

13. The method according to claim 12, further comprising arranging a center of the second excitation patch at a center of the first excitation patch.

14. The method according to claim 12, further comprising forming a parasitic patch.

15. An electronic device comprising a multiband patch antenna according to claim 1.

* * * * *